(12) United States Patent
Fukuyama et al.

(10) Patent No.: US 11,473,585 B2
(45) Date of Patent: Oct. 18, 2022

(54) TRANSMISSION AND CENTRIFUGAL COMPRESSOR

(71) Applicant: KABUSHIKI KAISHA TOYOTA JIDOSHOKKI, Kariya (JP)

(72) Inventors: Ryosuke Fukuyama, Kariya (JP); Kaho Takeuchi, Kariya (JP); Yoshiyuki Nakane, Kariya (JP); Hiroaki Kato, Kariya (JP); Satoru Mitsuda, Kariya (JP); Shogo Ito, Kariya (JP); Yohei Takase, Kariya (JP); Daisuke Watanabe, Kariya (JP); Ryo Umeyama, Kariya (JP); Noriyuki Suzuki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/540,972

(22) Filed: Dec. 2, 2021

(65) Prior Publication Data
US 2022/0178378 A1 Jun. 9, 2022

(30) Foreign Application Priority Data
Dec. 7, 2020 (JP) .............................. JP2020-202716

(51) Int. Cl.
*F04D 25/02* (2006.01)
*F04D 25/06* (2006.01)
(Continued)

(52) U.S. Cl.
CPC ....... *F04D 25/028* (2013.01); *F04D 25/0606* (2013.01); *F16H 57/0479* (2013.01); *F04D 29/059* (2013.01)

(58) Field of Classification Search
CPC .. F04D 25/028; F04D 25/0606; F04D 29/059; F04D 25/062; F04D 29/04;
(Continued)

(56) References Cited

U.S. PATENT DOCUMENTS

| 5,851,163 A | 12/1998 | Kawase et al. |
| 2004/0209730 A1 | 10/2004 | Okoshi |

(Continued)

FOREIGN PATENT DOCUMENTS

| JP | 04-078361 U | 7/1992 |
| JP | 09-264393 A | 10/1997 |

(Continued)

*Primary Examiner* — Jesse S Bogue
(74) *Attorney, Agent, or Firm* — Sughrue Mion, PLLC

(57) ABSTRACT

A transmission includes a transmission housing member, a ring portion, a high speed shaft, a third roller, and a third plate bearing, which rotatably supports the third roller. The transmission housing member includes a first supporting surface, which restricts the third roller to a first position, and a second supporting surface, which restricts the third roller to a second position. The third roller is moved within a movement range from the first position to the second position. The movement range includes a specified range in which the third roller is not supported, in a radial direction of the high speed shaft, by the transmission housing member with the third plate bearing in between, but is supported by being held between the ring portion and the high speed shaft.

12 Claims, 10 Drawing Sheets

(51) Int. Cl.
*F16H 57/04* (2010.01)
*F04D 29/059* (2006.01)

(58) Field of Classification Search
CPC ...... F04D 13/028; F04D 29/049; F16H 13/06;
F16H 57/0479
See application file for complete search history.

(56) References Cited

U.S. PATENT DOCUMENTS

2017/0284518 A1* 10/2017 Fukuyama ............... F16H 13/06
2017/0335891 A1* 11/2017 Hikida .................... F16C 19/28
2018/0283393 A1* 10/2018 Fukuyama ............ F04D 29/441

FOREIGN PATENT DOCUMENTS

| JP | 2004-308757 A | 11/2004 | |
|----|---------------|---------|---|
| JP | 2004-316881 A | 11/2004 | |
| WO | WO-2015111355 A1 * | 7/2015 | ........... F04D 25/028 |

* cited by examiner

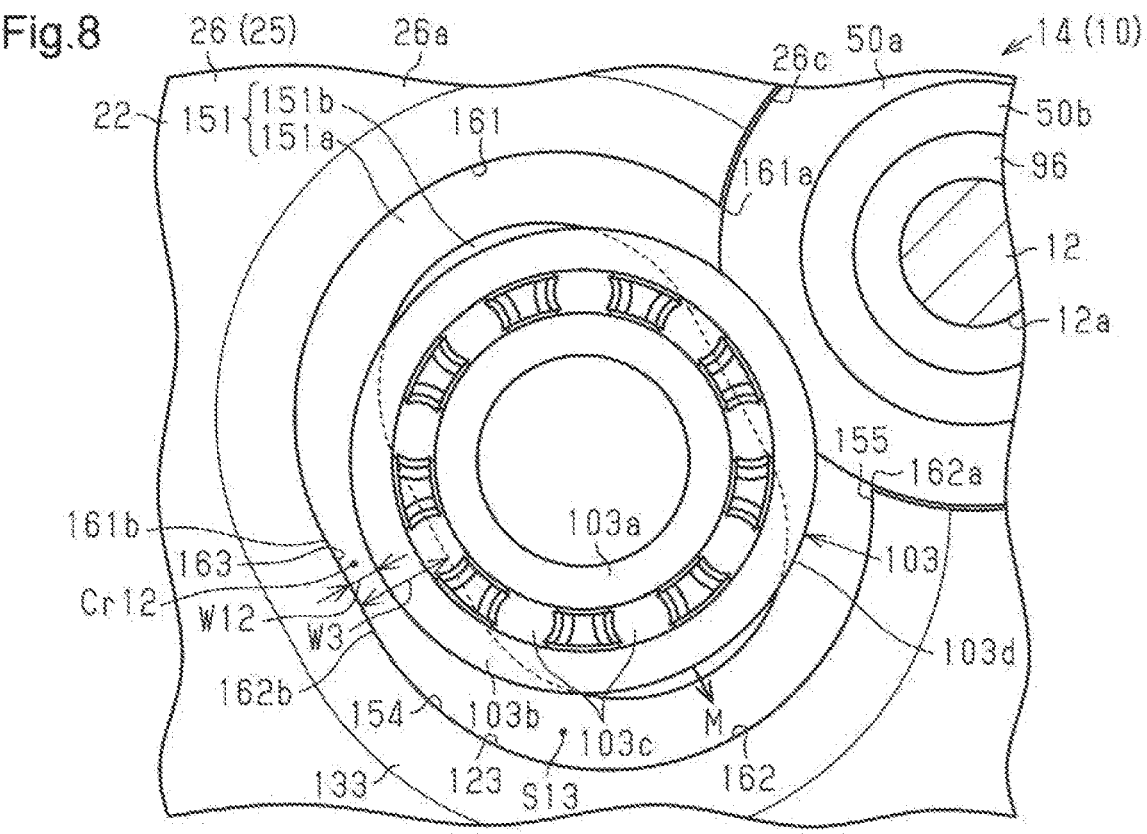
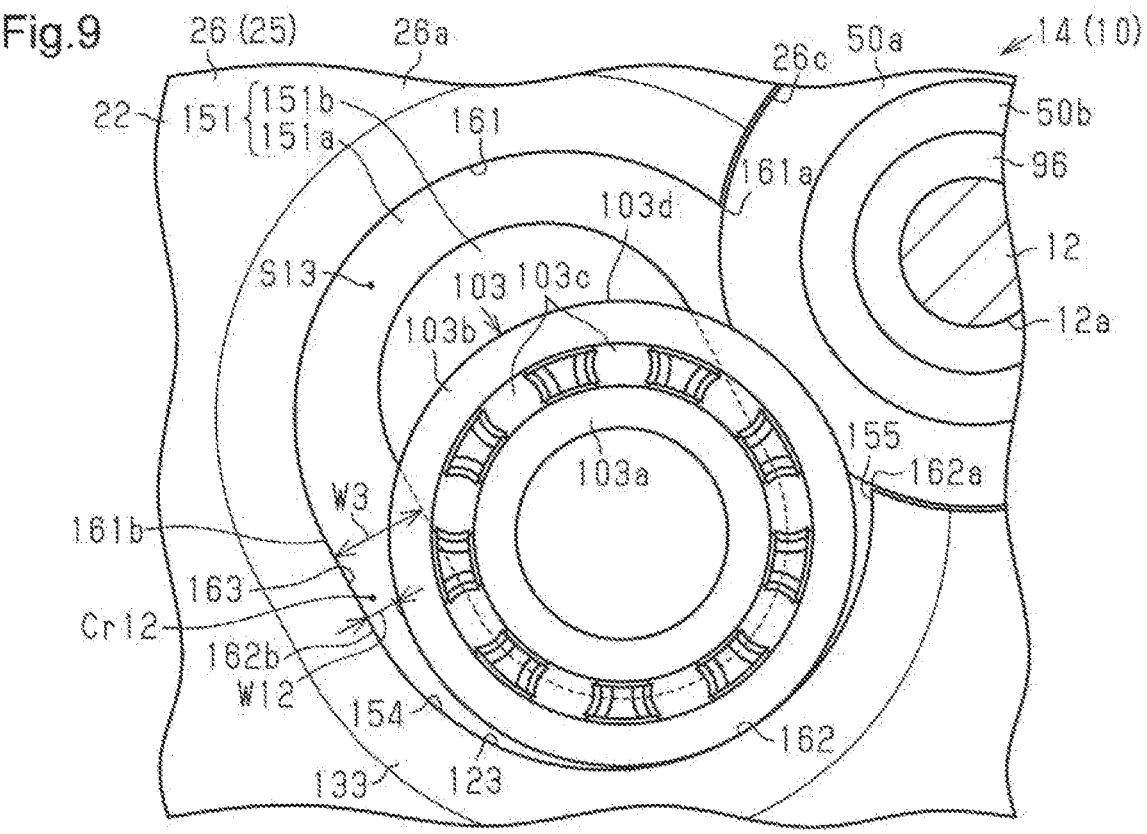

TRANSMISSION AND CENTRIFUGAL COMPRESSOR

BACKGROUND

1. Field

The present disclosure relates to a transmission and a centrifugal compressor equipped with the transmission.

2. Description of Related Art

As disclosed in Japanese Laid-Open Patent Publication No. 2004-308757, a transmission that transmits driving force between a low speed shaft and a high speed shaft has been known. The transmission disclosed in the document includes a transmission housing, an annular ring portion that rotates as a low speed shaft rotates, a high speed shaft arranged on the inner side of the ring portion, and rollers that are arranged between the ring portion and the high speed shaft. The rollers each have an outer circumferential surface that contacts both of the inner circumferential surface of the ring portion and the outer circumferential surface of the high speed shaft. The document also discloses that at least one of the rollers is a movable roller.

Some transmissions include a movable bearing that rotatably supports a movable roller. In this case, the movable bearing must support the movable roller such that the movable roller is movable. The movable bearing thus may be movable.

In such a configuration, displacement or dimensional errors may cause the movable bearing to be caught on the transmission housing. In this case, the movable bearing may hinder the movement of the movable roller. Also, sliding motion between the movable bearing and the transmission housing may wear components.

SUMMARY

Accordingly, it is an objective of the present disclosure to provide a transmission and a centrifugal compressor equipped with a transmission that allows a movable bearing to move smoothly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a transmission is provided that includes a transmission housing member, an annular ring portion that is provided in the transmission housing member and rotates as a low speed shaft rotates, a high speed shaft that is arranged on an inner side of the ring portion, at least three rollers that are provided between the ring portion and the high speed shaft and contact both of an inner circumferential surface of the ring portion and an outer circumferential surface of the high speed shaft, and radial bearings with which the rollers are rotatably supported by the transmission housing member. The rollers include a movable roller that moves in a rotation direction of the ring portion in response to rotation of the ring portion, and a fixed roller that is fixed so as not to move in the rotation direction of the ring portion. The radial bearings include a movable bearing that rotatably supports the movable roller. The transmission housing member includes a first supporting surface that contacts the movable bearing so as to restrict the movable roller to a first position, and a second supporting surface that is provided at a position spaced apart from first supporting surface in the rotation direction and contacts the movable bearing so as to restrict the movable roller to a second position. Movement of the movable roller is performed within a movement range from the first position to the second position. The movement range includes a specified range in which the movable roller is not supported, in a radial direction of the high speed shaft, by the transmission housing member with the movable bearing in between, but is supported by being held between the ring portion and the high speed shaft.

In a second general aspect, a transmission is provided that includes a transmission housing member, an annular ring portion that is provided in the transmission housing member and rotates as a low speed shaft rotates, a high speed shaft that is arranged on an inner side of the ring portion, at least three rollers that are provided between the ring portion and the high speed shaft and contact both of an inner circumferential surface of the ring portion and an outer circumferential surface of the high speed shaft, and roller bearings with which the at least three rollers are rotatably supported by the transmission housing member. The at least three rollers include at least one movable roller that moves, in response to rotation of the ring portion, between a first position and a second position that is spaced apart from the first position in a rotation direction of the ring portion, and at least two fixed rollers that are fixed so as not to move in the rotation direction of the ring portion. The roller bearings include a movable bearing that rotatably supports the movable roller. The transmission housing member includes, as surfaces that define a movable bearing accommodating chamber that accommodates the movable bearing, a bottom surface, and an accommodating side surface that extends from the bottom surface and includes the first supporting surface and the second supporting surface. The movable bearing accommodating chamber is arranged on an outer side of the high speed shaft in a radial direction of the high speed shaft. The accommodating side surface includes a first supporting surface that contacts the movable bearing so as to support the movable bearing when the movable roller is at the first position, and a second supporting surface that is provided at a position spaced apart from the first supporting surface in the rotation direction, and contacts the movable bearing so as to support the movable bearing when the movable roller is at the second position. The accommodating side surface includes a separated surface provided at a position separated from the movable bearing and on an outer side of the movable bearing in the radial direction of the high speed shaft. A clearance exists between the separated surface and the movable bearing regardless of a position of the movable bearing.

Other features and aspects will be apparent from the following detailed description, the drawings, and the claims.

BRIEF DESCRIPTION OF THE DRAWINGS

FIG. 8 is a front view of the third plate bearing when the third roller is at an intermediate position between the first position and a second position.

FIG. 9 is a front view of the third plate bearing when the third roller is at the second position.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A transmission 14 and a centrifugal compressor 10 equipped with the transmission 14 according to one embodiment will now be described. The following description merely illustrates one example, and the transmission 14 and the centrifugal compressor 10 are not limited to the contents of the present embodiment.

The centrifugal compressor 10 of the present embodiment is mounted on a fuel cell vehicle (FCV) equipped with a fuel cell, and is used to supply air to the fuel cell.

Figure 1:
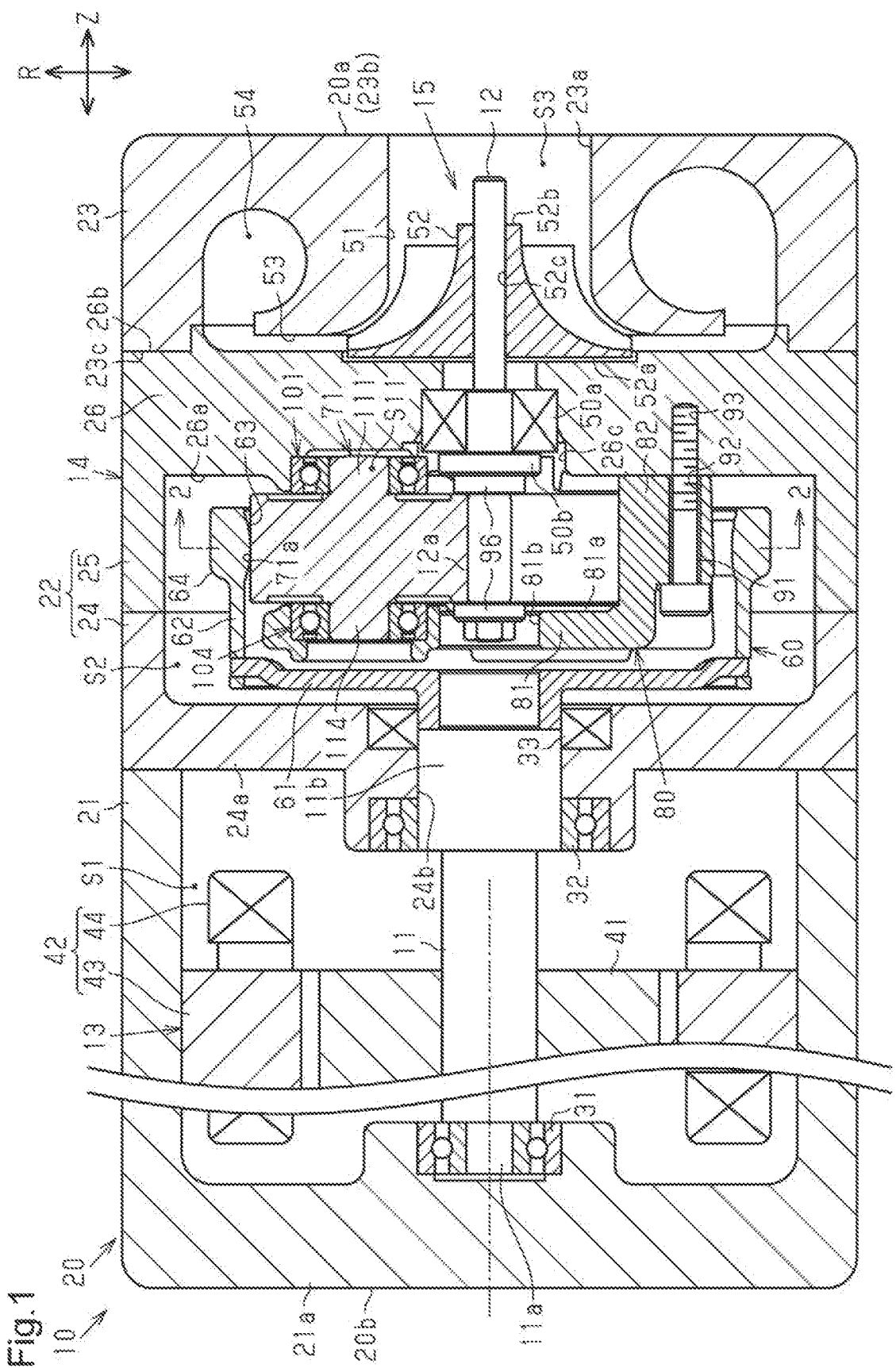
FIG. 1 is a cross-sectional view schematically showing one example of a centrifugal compressor.

As shown in FIG. 1, the centrifugal compressor 10 includes a low speed shaft 11, an electric motor 13, which rotates the low speed shaft 11, the transmission 14, which includes a high speed shaft 12 and a transmission housing member 22, and a compression unit 15, which compresses fluid (air in the present embodiment) by rotation of the high speed shaft 12. The shafts 11,12 are made of metal, for example. Specifically, the shafts 11, 12 are made of iron or an iron alloy.

The centrifugal compressor 10 includes a motor housing member 21, which accommodates the electric motor 13, and a compressor housing member 23, which has a suction port 23a. Fluid is drawn into the compressor housing member 23 through the suction port 23a. The motor housing member 21, the compressor housing member 23, and the transmission housing member 22 are assembled together. Specifically, the motor housing member 21 is attached to the transmission housing member 22 from the first direction, and the compressor housing member 23 is attached to the transmission housing member 22 from a direction opposite to the first direction. The motor housing member 21, the compressor housing member 23, and the transmission housing member 22 cooperate to form the general shape of the centrifugal compressor 10. For illustrative purposes, the motor housing member 21, the compressor housing member 23, and the transmission housing member 22 will be collectively referred to as a housing 20.

Generally, the housing 20 has a substantially tubular shape (specifically, a cylindrical shape). The housing 20 accommodates the shafts 11, 12, the electric motor 13, and the compression unit 15. The housing 20 is made of, for example, aluminum. However, the material of the housing 20 is not limited to this, but may be any suitable material. The suction port 23a is located in a first end face 20a of the housing 20 in the axial direction.

Generally, the motor housing member 21 has a substantially tubular shape (specifically, a cylindrical shape) and has a bottom portion 21a. The housing 20 includes end faces 20a, 20b on the opposite sides in the axial direction. The outer surface of the bottom portion 21a of the motor housing member 21 includes a second end face 20b, which is located on the side opposite to the first end face 20a, in which the suction port 23a is provided.

The transmission housing member 22, which is a portion of the transmission 14, includes a first part 24 and a second part 25, which are assembled together in the axial direction of the housing 20. The parts 24, 25 form a transmission chamber S2, which accommodates various components of the transmission 14. The transmission chamber S2 can also be regarded as an internal space of the transmission housing member 22, which is defined by the inner surface of the second part 25 and the inner surface of the first part 24.

Generally, the first part 24 has a substantially tubular shape (specifically, a cylindrical shape) and has a bottom portion 24a. The motor housing member 21 and the first part 24 are coupled to each other with the open end of the motor housing member 21 abutting against the bottom portion 24a of the first part 24. The inner surface of the motor housing member 21 and the surface of the bottom portion 24a of the first part 24 that faces the motor housing member 21 define a motor accommodating chamber S1, which accommodates the electric motor 13. The motor accommodating chamber S1 accommodates the low speed shaft 11 with the rotation axis direction of the low speed shaft 11 and the axial direction of the housing 20 agree with each other.

The low speed shaft 11 is rotatably supported by the housing 20. Specifically, the bottom portion 21a of the motor housing member 21 is provided with a first shaft bearing 31, which rotatably supports a first end portion 11a of the low speed shaft 11. Also, the bottom portion 24a of the first part 24 has a through-hole 24b. A second end portion 11b of the low speed shaft 11, which is on a side opposite to the first end portion 11a, is passed through the through-hole 24b. The inner surface of the through-hole 24b receives a second shaft bearing 32, which rotatably supports the second end portion 11b.

As shown in FIG. 1, the second end portion 11b of the low speed shaft 11 is passed through the through-hole 24b of the first part 24, and the low speed shaft 11 is partially disposed inside the transmission housing member 22 (in other words, in the transmission chamber S2). A seal member 33 is disposed between the inner surface of the through-hole 24b of the first part 24 and the second end portion 11b of the low speed shaft 11. The seal member 33 prevents oil in the first part 24 from flowing to the motor accommodating chamber S1.

The electric motor 13, which is accommodated in the motor accommodating chamber S1, includes a rotor 41 and a stator 42. The rotor 41 is fixed to the low speed shaft 11, and the stator 42 is arranged on the outer side of the rotor 41 and fixed to the inner surface of the motor housing member 21. The rotation axis of the rotor 41 and the central axis of the stator 42 are arranged on the same axis as the rotation axis of the low speed shaft 11. The rotor 41 and the stator 42 are opposed to each other in the radial direction of the low speed shaft 11.

The stator 42 includes a cylindrical stator core 43 and a coil 44 wound around the stator core 43. Current through the coil 44 causes the rotor 41 and the low speed shaft 11 to rotate integrally.

The second part 25 has a tubular shape (specifically, a cylindrical shape) having a plate portion 26 with a bottom portion, and opens to the first part 24. The first part 24 has a tubular shape with a closed end and has an opening on one side in the axial direction. The second part 25 and the first part 24 are assembled together with the open ends abutting against each other.

The plate portion 26 includes a first plate surface 26a, which defines the transmission chamber S2, and a second plate surface 26b, which is on a side opposite to the first plate surface 26a. The plate surfaces 26a, 26b intersect with (are orthogonal to, in an example) the rotation axis direction Z of the high speed shaft 12. For illustrative purposes, the rotation axis direction Z of the high speed shaft 12 will be simply referred to as the rotation axis direction Z. The rotation axis direction Z is the axial direction of the high speed shaft 12.

As shown in FIG. 1, the plate portion 26 of the second part 25 has a plate through-hole 26c. The high speed shaft 12, which is a portion of the transmission 14, is passed through the plate through-hole 26c. The high speed shaft 12 is partially disposed inside the compressor housing member 23 through the plate through-hole 26c.

A seal member 50a is disposed between the inner surface of the plate through-hole 26c and the high speed shaft 12. The seal member 50a prevents oil in the transmission housing member 22 from flowing into the compressor housing member 23. The seal member 50a is fitted to the inner surface of the plate through-hole 26c, such that there is no clearance into which oil can enter between the seal member 50a and the plate through-hole 26c.

The high speed shaft 12 includes a stopper portion 50b, which abuts against the seal member 50a. The stopper portion 50b has the shape of a flange that protrudes from the high speed shaft 12 in a radial direction R of the high speed shaft 12. The stopper portion 50b is disposed in the plate through-hole 26c. The seal member 50a is provided in the plate through-hole 26c while pressing the stopper portion 50b.

For illustrative purposes, the radial direction R of the high speed shaft 12 will be simply referred to as the radial direction R. The radial direction R agrees with the radial direction of the low speed shaft 11.

In the present embodiment, the stopper portion 50b and the inner surface of the plate through-hole 26c are spaced apart from each other in the radial direction R so that a clearance exists in between, as shown in FIG. 1. For example, the stopper portion 50b and the high speed shaft 12 are formed integrally. However, the configuration is not limited to this and the stopper portion 50b and the high speed shaft 12 may be provided as separate components.

The compressor housing member 23 is substantially tubular and has a compressor through-hole 51 extending in the axial direction. The compressor housing member 23 includes a first end face 23b in the axial direction. The first end face 23b of the compressor housing member 23 forms the first end face 20a in the axial direction of the housing 20. The compressor through-hole 51 has an opening in the first end face 23b. The opening functions as the suction port 23a.

The compressor housing member 23 includes a second end face 23c, which is on the side opposite in the axial direction to the first end face 23b of the compressor housing member 23. The second plate surface 26b of the plate portion 26 is on the side opposite to the first plate surface 26a. The compressor housing member 23 and the second part 25 are assembled together with the second end face 23c and the second plate surface 26b abutting against each other. In this case, the inner surface of the compressor through-hole 51 and the second plate surface 26b of the plate portion 26 define an impeller chamber S3. The impeller chamber S3 accommodates an impeller 52, which serves as the compression unit 15. That is, the compressor through-hole 51 defines the impeller chamber S3 as well as the suction port 23a. The suction port 23a is continuous with the impeller chamber S3.

That is, the compressor housing member 23 can also be regarded as a component that cooperates with the plate portion 26 to define the impeller chamber S3, and the plate portion 26 can also be regarded as a wall separating the transmission chamber S2 and the impeller chamber S3 from each other.

The compressor through-hole 51 has a constant diameter from the suction port 23a to an intermediate position in the axial direction. The diameter then gradually increases from the intermediate position toward the second plate surface 26b of the plate portion 26, so that the compressor through-hole 51 substantially has the shape of a truncated cone. Thus, the impeller chamber S3, which is defined by the inner surface of the compressor through-hole 51, substantially has the shape of a truncated cone.

The impeller 52 is tubular and has a diameter that gradually decreases from a proximal end face 52a toward a distal end face 52b. The impeller 52 has an insertion hole 52c, which extends in the rotation axis direction of the impeller 52. The high speed shaft 12 can be passed through the insertion hole 52c. The impeller 52 is attached to the high speed shaft 12 to rotate integrally with the high speed shaft 12 with the part of the high speed shaft 12 that protrudes into the compressor through-hole 51 inserted into the insertion hole 52c. When the high speed shaft 12 rotates, the impeller 52 rotates, so that fluid drawn through the suction port 23a is compressed.

Also, the centrifugal compressor 10 includes a diffuser passage 53, into which fluid compressed by the impeller 52 flows, and a discharge chamber 54, into which the fluid that has passed through the diffuser passage 53 flows. The diffuser passage 53 is defined by the second plate surface 26b of the plate portion 26 and a surface of the compressor housing member 23 that is opposed to the second plate surface 26b. Specifically, the diffuser passage 53 is defined by the second plate surface 26b and a surface that is continuous with the open end of the compressor through-hole 51 on the side corresponding to the second plate surface 26b. The diffuser passage 53 is arranged on the outer side of the impeller chamber S3 in the radial direction R and has an annular shape (specifically, a circular shape) to surround the impeller 52 (the impeller chamber S3). The discharge chamber 54 is annular and arranged on the outer side of the diffuser passage 53 in the radial direction R. The impeller chamber S3 and the discharge chamber 54 are continuous with each other through the diffuser passage 53. Fluid compressed by the impeller 52 flows through the diffuser passage 53 to be compressed further, and flows to the discharge chamber 54 to be discharged from the discharge chamber 54.

The transmission 14 will now be described.

The transmission 14 of the present embodiment includes a high speed shaft 12 and is a speed increaser that increases the speed of the rotation of the low speed shaft 11 and transmits it to the high speed shaft 12. The transmission 14 is, for example, of a traction drive type (a friction roller type).

As shown in FIG. 1, the transmission 14 includes a plate-shaped base portion 61, which is attached to the second end portion 11b of the low speed shaft 11, and a ring portion 62, which is attached to opposite ends of the base portion 61. The base portion 61 and the ring portion 62 are accommodated in the transmission housing member 22 (in other words, in the transmission chamber S2). The base portion 61 and the ring portion 62 rotate as the low speed shaft 11 rotates.

The ring portion 62 is made of, for example, metal. The ring portion 62 has an axial direction, which agrees with the rotation axis direction Z, and extends from the base portion 61 toward the plate portion 26. The ring portion 62 has an annular shape (specifically, a circular shape) as viewed in the rotation axis direction of the ring portion 62, and includes an inner circumferential surface 63 and an outer circumferential surface 64. In the present embodiment, the diameter of the inner circumferential surface 63 of the ring portion 62 is constant in the rotation axis direction of the ring portion 62, and greater than the diameter of the second end portion 11b of the low speed shaft 11.

In the present embodiment, a ring member 60 is coupled to the low speed shaft 11 such that the rotation axis of the base portion 61 (the rotation axis of the ring member 60) and the rotation axis of the low speed shaft 11 agree with each other. In this case, the rotation axis of the ring portion 62 also agrees with the rotation axis of the low speed shaft 11. The inner diameter and the outer diameter of the ring portion 62 are diameters having a center that agrees with the rotation axis of the low speed shaft 11.

The rotation axis direction of the low speed shaft 11, the rotation axis direction Z of the high speed shaft 12, and the rotation axis direction of the ring portion 62 agree with one another. Thus, the rotation axis direction Z of the high speed shaft 12 can be referred to as the rotation axis direction of the ring portion 62, or the rotation axis direction of the low speed shaft 11. For illustrative purposes, the rotation direction of the ring portion 62 will be simply referred to as a rotation direction M. The rotation direction M is the same as a circumferential direction of the high speed shaft 12.

Figure 2:
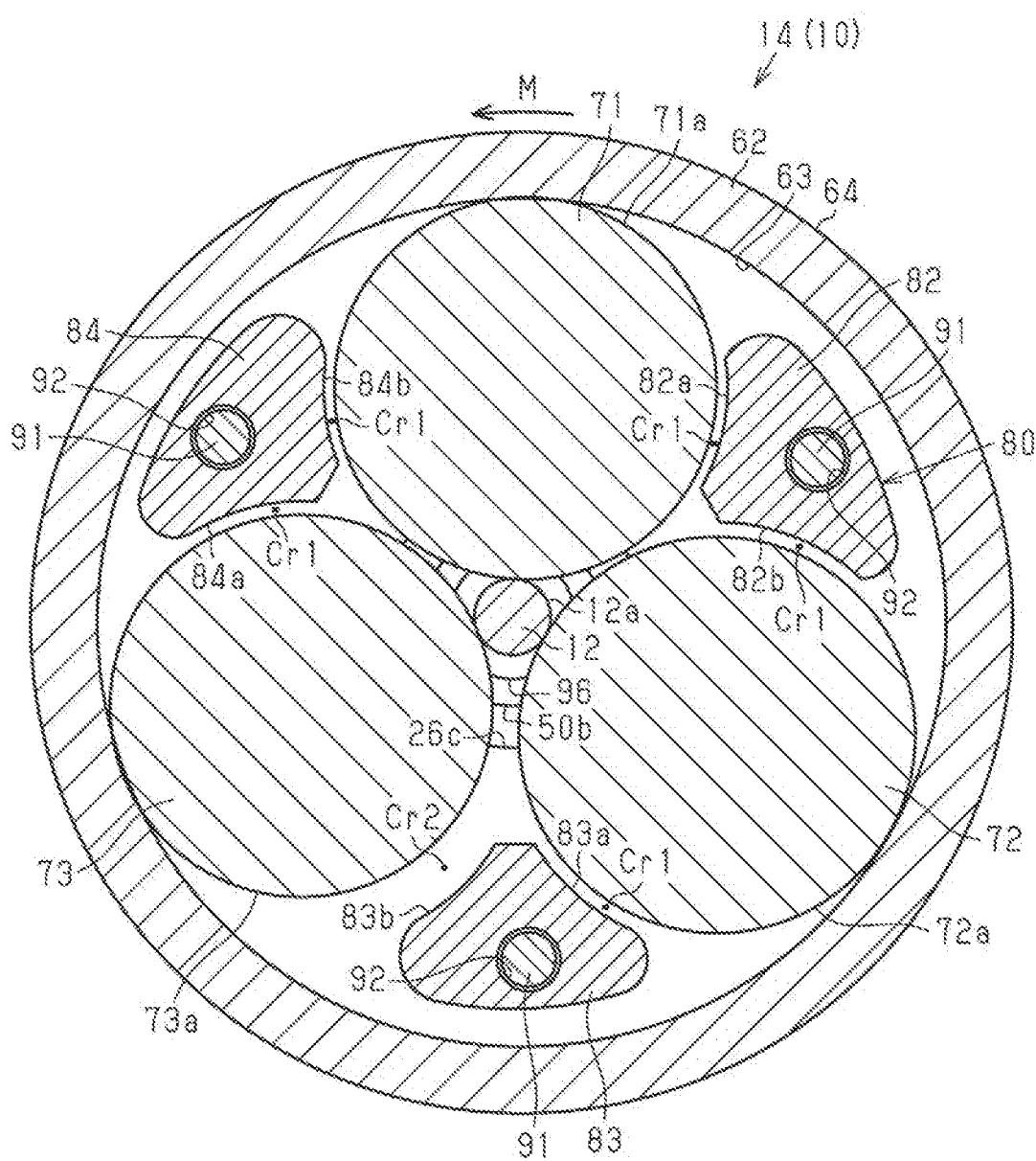
FIG. 2 is a cross-sectional view taken along line 2-2 in FIG. 1.

The high speed shaft 12 is partially disposed on the inner side of the ring portion 62. As shown in FIG. 2, the transmission 14 includes rollers 71 to 73, which are provided between the high speed shaft 12 and the ring portion 62 to contact both the inner circumferential surface 63 of the ring portion 62 and an outer circumferential surface 12a of the high speed shaft 12. The rollers 71 to 73 are accommodated in the transmission housing member 22 (in other words, in the transmission chamber S2).

The rollers 71 to 73 are made of, for example, metal. Specifically, the rollers 71 to 73 are made of the same metal as that of the high speed shaft 12 and the ring member 60 (the ring portion 62). For example, the rollers 71 to 73 are made of iron or an iron alloy. Oil is supplied to the high speed shaft 12, the ring portion 62, and the rollers 71 to 73.

The rollers 71 to 73 are columnar. The rotation axis direction of the rollers 71 to 73 agrees with the rotation axis direction Z of the high speed shaft 12. Thus, the rotation axis direction Z can be referred to as the rotation axis direction of the rollers 71 to 73. The rollers 71 to 73 are arranged in the circumferential direction of the high speed shaft 12 to surround the high speed shaft 12.

In the present embodiment, a first roller 71 and a second roller 72 of the rollers 71 to 73 are fixed rollers rotatably fixed to the transmission housing member 22. The first roller 71 and the second roller 72 are fixed to the transmission housing member 22 so as not to move in the rotation direction M regardless of the rotation of the ring portion 62 (in other words, the rotation of the low speed shaft 11). In contrast, a third roller 73 is a movable roller, which moves in the rotation direction M of the ring portion 62 in response to the rotation of the ring portion 62 (in other words, the rotation of the low speed shaft 11).

As shown in FIGS. 1 and 2, the transmission 14 includes a supporting member 80, which cooperates with the transmission housing member 22 (specifically, the second part 25) to rotatably support the rollers 71 to 73. The supporting member 80 is arranged inside the ring portion 62.

The supporting member 80 includes a disc-shaped supporting base portion 81, which is slightly smaller than the ring portion 62, and three supporting portions 82 to 84, which extend from the supporting base portion 81.

The supporting base portion 81 is located at a position where its plate surface is opposed to a plate surface of the base portion 61 of the ring member 60. The supporting base portion 81 is arranged to be opposed to the plate portion 26 in the rotation axis direction Z. The supporting base portion 81 includes an opposed plate surface 81a, which is opposed to the first plate surface 26a of the plate portion 26.

The three supporting portions 82 to 84 extend from the opposed plate surface 81a toward the plate portion 26, and to occupy three spaces each defined by the inner circumferential surface 63 of the ring portion 62 and the outer circumferential surfaces of adjacent two of the rollers 71 to 73.

As shown in FIGS. 1 and 2, the supporting portions 82 to 84 each have a threaded hole 92, into which a bolt 91 can be threaded. The bolt 91 functions as a fastener. The plate portion 26 has threaded holes 93 in the first plate surface 26a in correspondence with the threaded holes 92. The threaded holes 93 are continuous with the threaded holes 92. The supporting portions 82 to 84 are arranged at positions where the threaded holes 92 and the threaded holes 93 are continuous with each other, and the distal end faces of the supporting portions 82 to 84 abut against the first plate surface 26a. In this state, the bolts 91 are threaded into the threaded holes 92 and the threaded holes 93, to fix the supporting portions 82 to 84 to the plate portion 26.

The first roller 71, the second roller 72, and the third roller 73 are arranged between the plate portion 26 and the supporting base portion 81. The supporting portions 82 to 84 are configured such that the first roller 71 and the second roller 72 do not move in the circumferential direction of the ring portion 62 as the ring portion 62 moves, and that the third roller 73 can move in the rotation direction M.

Specifically, as shown in FIG. 2, the first supporting portion 82 has a first curved surface 82a, which is opposed to an outer circumferential surface 71a of the first roller 71 with a first clearance Cr1 in between, and a second curved surface 82b, which is opposed to an outer circumferential surface 72a of the second roller 72 with a first clearance Cr1 in between. The first curved surface 82a extends along the outer circumferential surface 71a of the first roller 71. The second curved surface 82b extends along the outer circumferential surface 72a of the second roller 72.

The second supporting portion 83 has a third curved surface 83a, which is opposed to the outer circumferential surface 72a of the second roller 72 with a first clearance Cr1 in between, and a fourth curved surface 83b, which is opposed to an outer circumferential surface 73a of the third roller 73 with a second clearance Cr2 in between. The second clearance Cr2 is larger than the first clearance Cr1. The third curved surface 83a extends along the outer circumferential surface 72a of the second roller 72. The fourth curved surface 83b extends along the outer circumferential surface 73a of the third roller 73.

The third supporting portion 84 has a fifth curved surface 84a, which is opposed to the outer circumferential surface 73a of the third roller 73 with a first clearance Cr1 in between, and a sixth curved surface 84b, which is opposed to the outer circumferential surface 71a of the first roller 71 with a first clearance Cr1 in between. The fifth curved surface 84a extends along the outer circumferential surface 73a of the third roller 73. The sixth curved surface 84b extends along the outer circumferential surface 71a of the first roller 71.

With the above-described configuration, the second clearance Cr2, which is larger than the first clearance Cr1, exists between the outer circumferential surface 73a of the third roller 73 and the fourth curved surface 83b, so that the third roller 73 can move in the rotation direction M. Specifically, the third roller 73 can move between a first position and a second position, which is spaced apart from the first position in the rotation direction M. In the present embodiment, the first position is a position where the outer circumferential surface 73a of the third roller 73 and the fifth curved surface 84a are opposed to each other with the first clearance Cr1 in between, and the second position is a position where the outer circumferential surface 73a of the third roller 73 and the fourth curved surface 83b are opposed to each other with the first clearance Cr1 in between.

On the other hand, the first clearance Cr1, which is smaller than the second clearance Cr2, exists between the first and second rollers 71, 72 and the supporting portions 82 to 84. The first clearance Cr1 is designed to prevent the rollers 71, 72 from sliding on the supporting portions 82 to 84.

As shown in FIG. 2, the rollers 71 to 73 are held by the ring portion 62 and the high speed shaft 12 from the opposite sides in the radial direction R, and pressed inward in the radial direction R by the ring portion 62. This restricts the rollers 71 to 73, including the third roller 73, from moving in the radial direction R.

The diameters of the rollers 71 to 73 (the dimensions of the rollers 71 to 73 in directions intersecting the rotation axis direction Z) are set to be greater than the diameter of the high speed shaft 12. The diameters of the rollers 71 to 73 are set to be smaller than the radius of the inner circumferential surface 63 of the ring portion 62, so that the rollers 71 to 73 can be arranged in the ring portion 62.

As shown in FIG. 2, the diameter of the second roller 72 is different from the diameter of the first roller 71 and the third roller 73. Specifically, the diameter of the second roller 72 is greater than the diameter of the first roller 71 and the third roller 73. Thus, the high speed shaft 12, which is supported by being pressed against the rollers 71 to 73, and the ring portion 62 (in other words, the low speed shaft 11) are eccentric to each other. Specifically, the rotation axis of the high speed shaft 12 and the rotation axis of the ring portion 62 are not aligned with each other.

As shown in FIG. 1, the high speed shaft 12 has two flanges 96 extending outward in the radial direction R from the outer circumferential surface 12a. The flanges 96 are spaced apart from each other in the rotation axis direction Z and arranged on the opposite sides. The rollers 71 to 73 are held by the two flanges 96 from the opposite sides in the rotation axis direction Z. This limits displacement in the rotation axis direction Z between the high speed shaft 12 and the rollers 71 to 73. For example, if a thrust force in the rotation axis direction Z is generated by the rotation of the impeller 52, the end face of the first roller 71 on the side closer to the impeller 52 in the rotation axis direction Z and the flange 96 on the side closer to the impeller 52 contact each other, restricting further movement.

The distance in the rotation axis direction Z between the flanges 96 is slightly wider than the dimension of the rollers 71 to 73 in the rotation axis direction Z. Accordingly, clearances into which oil can flow exist between the flanges 96 and the end faces of the rollers 71 to 73 in the rotation axis direction Z.

The supporting base portion 81 has a through-hole 81b, which is slightly larger than the flanges 96, in a central portion. The flange 96 on the side closer to the base portion 61 is arranged in the through-hole 81b.

The flange 96 on the side closer to the impeller 52 is located on the side of the stopper portion 50b opposite to the seal member 50a. In the present embodiment, the flanges 96 are shorter in the radial direction R than the stopper portion 50b.

Figure 3:
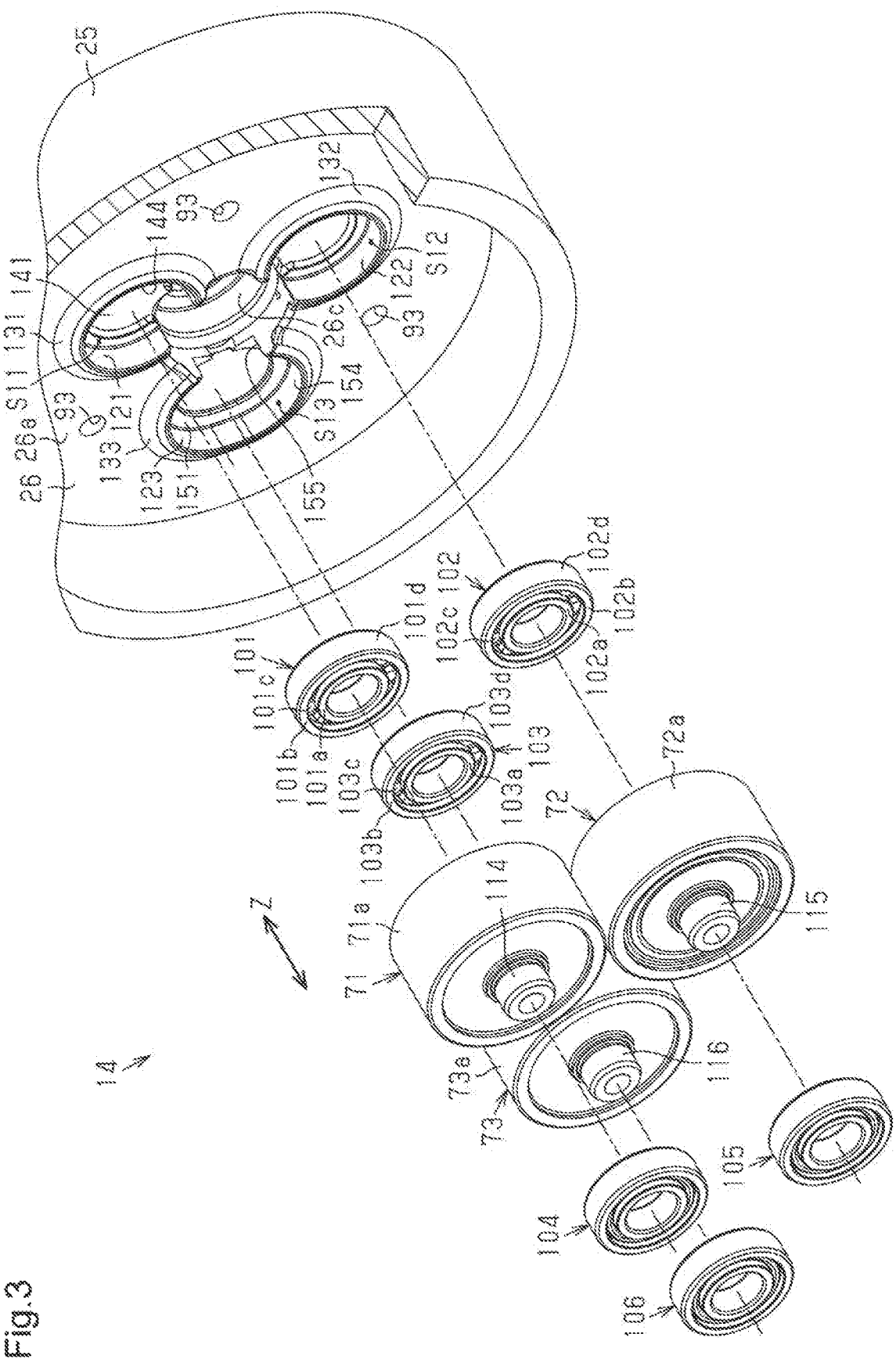
FIG. 3 is an exploded perspective view showing rollers, roller bearings, and a second part.

As shown in FIGS. 1 and 3, the centrifugal compressor 10 (specifically, the transmission 14) includes roller bearings 101 to 106, which rotatably support the rollers 71 to 73 in the transmission housing member 22. The roller bearings 101 to 106 are radial bearings. In the present embodiment, the roller bearings 101 to 106 correspond to "radial bearings."

The roller bearings 101 to 106 include plate bearings 101 to 103, which are attached to the plate portion 26, and supporting bearings 104 to 106, which are attached to the supporting member 80 (specifically, the supporting base portion 81). As already described, the supporting member 80, which includes the supporting base portion 81, is fixed to the plate portion 26, which is a portion of the transmission housing member 22. Thus, the supporting bearings 104 to 106, which are attached to the supporting base portion 81, can be regarded to be attached to the transmission housing member 22 with the supporting member 80.

The plate bearings 101 to 103 have, for example, circular shapes. The plate bearings 101 to 103 are, for example, rolling-element bearings, which respectively include inner races 101a to 103a, outer races 101b to 103b, and rolling elements 101c to 103c provided between the inner races 101a to 103a and the outer races 101b to 103b. The inner races 101a to 103a rotate relative to the outer races 101b to 103b as the rollers 71 to 73 rotate. That is, the outer races 101b to 103b are less likely to rotate than the inner races 101a to 103a, when the rollers 71 to 73 rotate.

The plate bearings 101 to 103 respectively include outer circumferential surfaces 101d to 103d. The outer circumferential surfaces 101d to 103d of the plate bearings 101 to 103 are the outer circumferential surfaces of the outer races 101b to 103b. The outer diameter of the plate bearings 101 to 103 is the outer diameter of the outer races 101b to 103b. The inner diameter of the plate bearings 101 to 103 is the inner diameter of the inner races 101a to 103a. Since the structure of the supporting bearings 104 to 106 is identical to that of the plate bearings 101 to 103, the description thereof is omitted.

Figure 4:
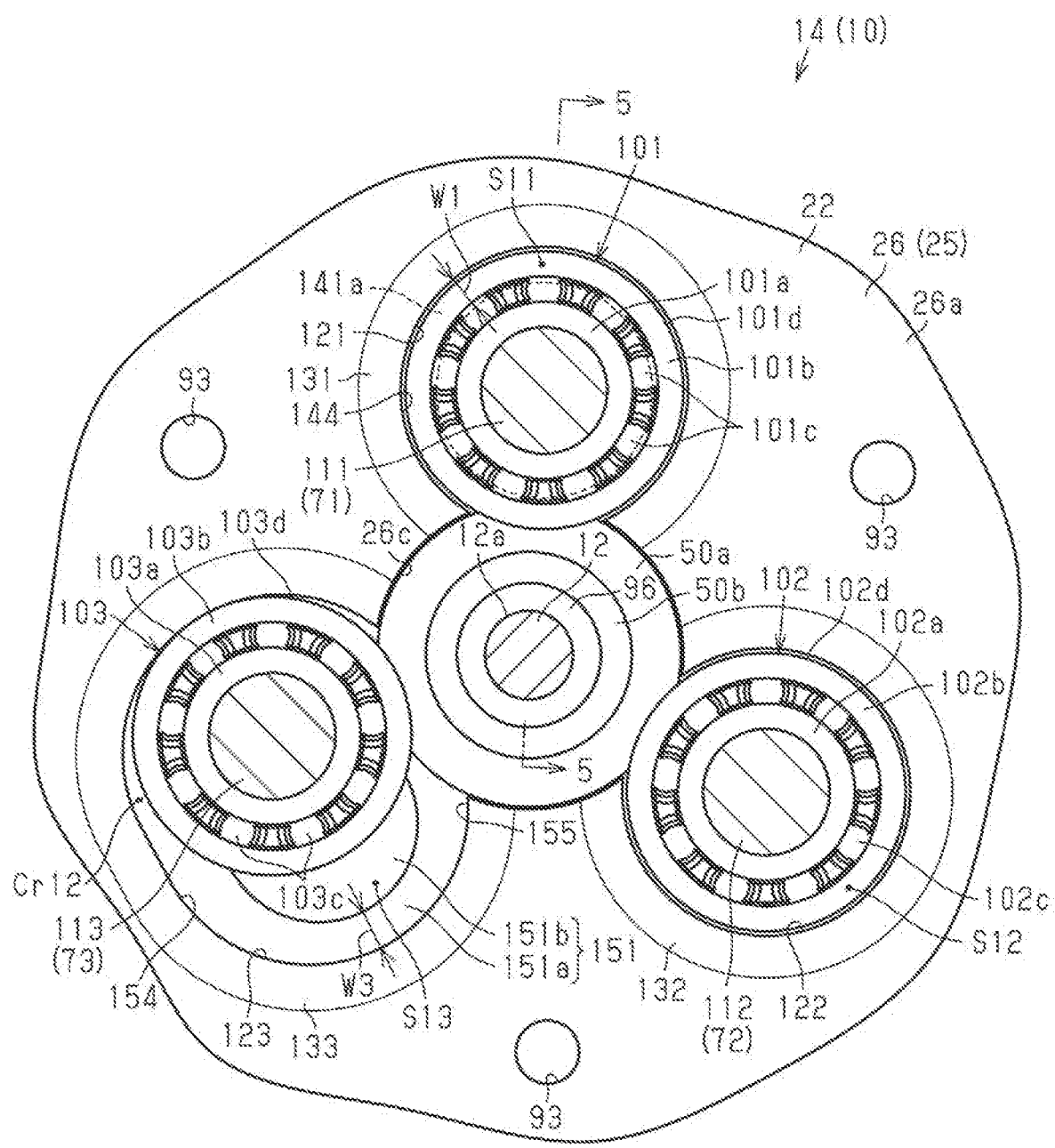
FIG. 4 is a front view showing a plate portion and plate bearings.

As shown in FIGS. 1, 3, and 4, the rollers 71 to 73 respectively have protrusions 111 to 116 on the opposite end faces in the rotation axis direction Z. The protrusions 111 to 116 each have a columnar shape and located at the center of the corresponding end face. The protrusions 111 to 116 include plate protrusions 111 to 113 located on the side closer to the plate portion 26, and supporting protrusions 114 to 116 on the side closer to the supporting base portion 81. For illustrative purposes, the plate protrusions 111 to 113 are represented by hatching in FIG. 4.

The plate portion 26, which is a portion of the transmission housing member 22, has plate bearing accommodating chambers S11 to S13, which accommodate the plate bearings 101 to 103. The plate bearings 101 to 103 are arranged in the plate bearing accommodating chambers S11 to S13, while rotatably supporting the plate protrusions 111 to 113. The plate protrusions 111 to 113 are fitted in the inner races 101a to 103a of the plate bearings 101 to 103.

Likewise, the supporting base portion 81 of the supporting member 80 has three supporting bearing accommodating chambers, which accommodate the supporting bearings 104 to 106. The supporting bearings 104 to 106 are arranged in the supporting bearing accommodating chambers, while rotatably supporting the supporting protrusions 114 to 116. Accordingly, the supporting protrusions 114 to 116 are supported by the supporting bearings 104 to 106 on the supporting base portion 81.

With the above-described configuration, the rollers 71 to 73 are rotatably supported by the roller bearings 101 to 106 on the transmission housing member 22. In the present embodiment, the third plate bearing 103 corresponds to the "movable bearing," and the third plate bearing accommodating chamber S13 corresponds to the "movable bearing accommodating chamber."

Next, chambers that accommodate the roller bearings 101 to 106 and the roller bearings 101 to 106 will be described. The structures of the supporting bearings 104 to 106 and the supporting bearing accommodating chambers are identical to those of the plate bearings 101 to 103 and the plate bearing accommodating chambers S11 to S13. Therefore, the structures of the plate bearings 101 to 103 and the plate bearing accommodating chambers S11 to S13 will be described, and the description of the supporting bearings 104 to 106 and the supporting bearings accommodating chambers will be omitted.

The plate bearing accommodating chambers S11 to S13 are arranged on the outer side of the high speed shaft 12 in the radial direction R of the high speed shaft 12. Specifically, as already described, the plate portion 26 has the plate through-hole 26c, through which the high speed shaft 12 is inserted, and the plate bearing accommodating chambers S11 to S13 are located around the plate through-hole 26c. For example, the plate bearing accommodating chambers S11 to S13 are arranged at equal intervals (120°) around the plate through-hole 26c.

Figure 5:
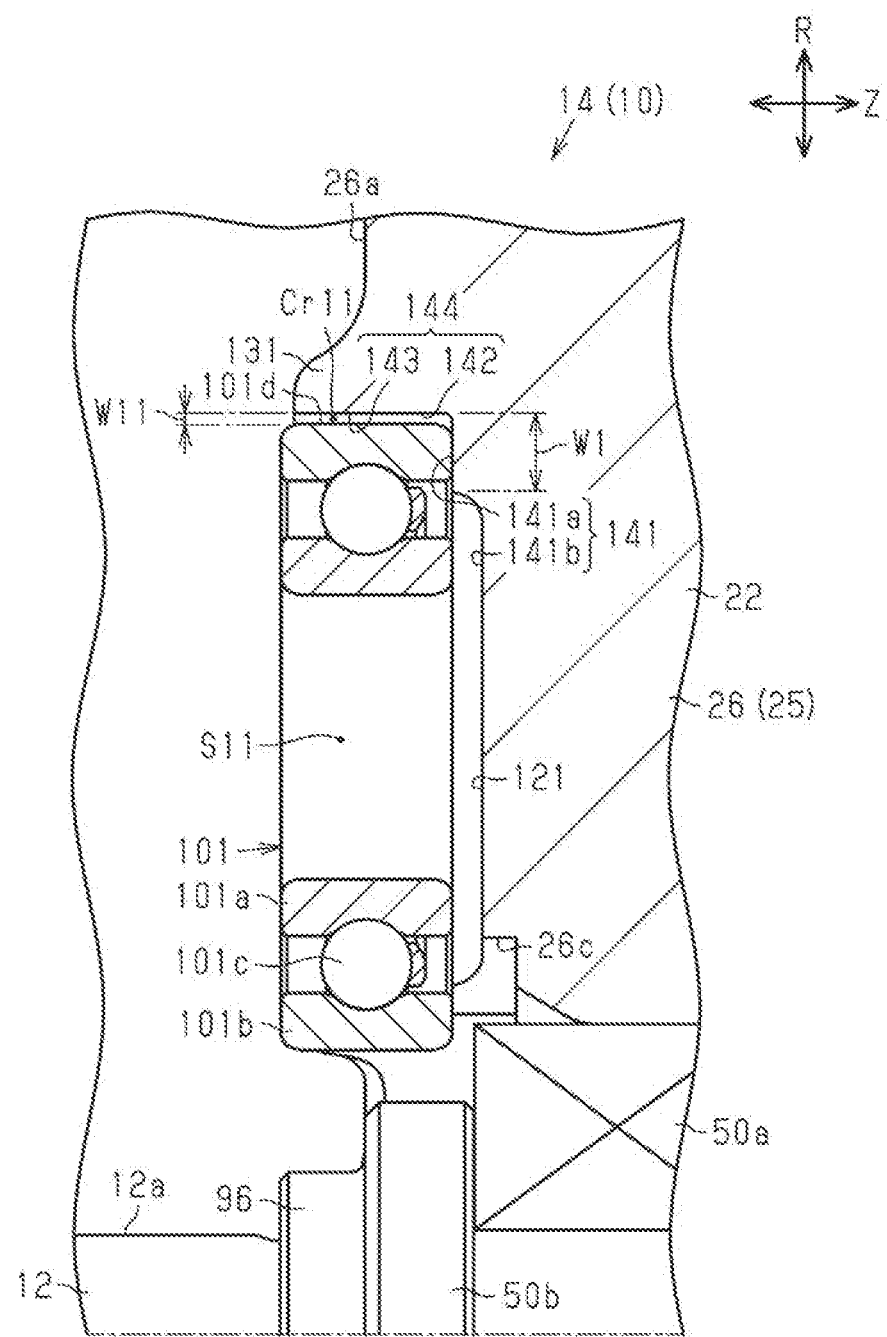
FIG. 5 is a cross-sectional view taken along line 5-5 in FIG. 4.

As shown in, for example, FIG. 4, the plate bearing accommodating chambers S11 to S13 are respectively continuous with the plate through-hole 26c, so that the plate bearings 101 to 103 accommodated in the plate bearing accommodating chambers S11 to S13 are partially located in the plate through-hole 26c. As such, as shown in FIG. 5, the flange 96 and the stopper portion 50b are located in the plate through-hole 26c at a position on the inner side of the plate bearing accommodating chambers S11 to S13 in the radial direction R.

Also, as already described, a clearance exists between the stopper portion 50b and the inner surface of the plate through-hole 26c in the radial direction R, and the flange 96 is shorter than the stopper portion 50b in the radial direction R. Accordingly, a clearance exists between the plate bearings 101 to 103, and the stopper portion 50b and the flange 96, so that the plate bearings 101 to 103 do not interfere with the stopper portion 50b or the flanges 96.

As viewed in the rotation axis direction Z, portions of the plate bearings 101 to 103 that are located in the plate through-hole 26c overlap with the seal member 50a. That is, in the present embodiment, the plate bearings 101 to 103 and the seal member 50a are displaced from each other in the rotation axis direction Z. Further, the plate bearings 101 to 103 are arranged to be relatively close to the high speed shaft 12, so as to partially overlap with the seal member 50a as viewed in the rotation axis direction Z. This reduces the size of the transmission 14 in the radial direction R. Also, at least one of the stopper portion 50b and the flange 96 (both of these in the present embodiment) is arranged between the plate bearings 101 to 103 and the high speed shaft 12. This allows the space on the inner side of the plate bearings 101 to 103 in the radial direction R to be used effectively, thereby reducing the size of the transmission 14 in the rotation axis direction Z.

The plate bearing accommodating chambers S1*l* to S13 will now be described.

As shown in FIGS. 3 and 4, the plate portion 26 includes plate recesses 121 to 123 in the first plate surface 26a, and plate extending portions 131 to 133 extending from the first plate surface 26a. The plate bearing accommodating chambers S11 to S13 are defined by the plate recesses 121 to 123 and the plate extending portions 131 to 133.

With reference to FIGS. 4 and 5, the first plate recess 121 and the first plate extending portion 131, which define the first plate bearing accommodating chamber S11, will be described.

As shown in FIG. 4, the first plate recess 121 has the same shape as the outer shape of the first plate bearing 101. Specifically, the first plate recess 121 has a circular shape as viewed in the rotation axis direction Z in correspondence with the disc-shaped first plate bearing 101. The diameter of the first plate recess 121 is slightly greater than the outer diameter of the first plate bearing 101. The first plate recess 121 opens to the plate through-hole 26c. The first plate recess 121 and the plate through-hole 26c are thus continuous with each other.

As shown in FIGS. 4 and 5, the first plate recess 121 includes a first bottom surface 141 and a first recess side surface 142.

Generally, the first bottom surface 141 has a circular shape. The diameter of the first plate recess 121 can also be regarded as the diameter of the first bottom surface 141.

In the present embodiment, the first bottom surface 141 has a stepped structure. Specifically, the first bottom surface 141 includes a first outer bottom portion 141a, which extends along the first recess side surface 142, and a first inner bottom portion 141b, which is located on the inner side of the first outer bottom portion 141a and recessed with respect to the first outer bottom portion 141a.

The first outer bottom portion 141a has the shape of a ring (specifically, a circular shape) that has a specific first width W1, and extends in the circumferential direction of the first recess side surface 142. In other words, the first outer bottom portion 141a extends from the first recess side surface 142 toward the center of the first bottom surface 141 by the first width W1. In the present embodiment, the first outer bottom portion 141a has the shape of a C that opens toward the plate through-hole 26c.

The first inner bottom portion 141b is surrounded by the first outer bottom portion 141a. The first inner bottom portion 141b is substantially circular as viewed in the rotation axis direction Z.

In the present embodiment, the outer race 101b of the first plate bearing 101 is supported by contacting the first outer bottom portion 141a as shown in FIG. 5. In contrast, the inner race 101a of the first plate bearing 101 does not contact the first outer bottom portion 141a. Specifically, the inner race 101a of the first plate bearing 101 and the first inner bottom portion 141b are opposed to each other with a clearance in between. That is, the first outer bottom portion 141a of the present embodiment is a contact portion that contacts the outer race 101b, but does not contact the inner race 101a.

Specifically, the first width W1 is wider than the thickness of the outer race 101b of the first plate bearing 101. The thickness of the outer race 101b can also be regarded as the dimension of the outer race 101b in the radial direction. On the other hand, the first width W1 is set to be shorter than the thickness of the first plate bearing 101 as a whole such that the inner edge of the first outer bottom portion 141a is located on the outer side of the outer circumferential surface of the inner race 101a.

The first recess side surface 142 extends from the first bottom surface 141 (specifically, from the first outer bottom portion 141a), and has the shape of a C that opens toward the plate through-hole 26c. The diameter of the first plate recess 121 can also be regarded as the diameter of the first recess side surface 142.

The first plate extending portion 131 is located on the periphery of the first plate recess 121. The first plate extending portion 131 includes a first extending side surface 143, which is continuous with the first recess side surface 142. The first recess side surface 142 and the first extending side surface 143 are flush with each other.

The first plate bearing accommodating chamber S11 of the present embodiment is defined by the first bottom surface 141 and a first accommodating side surface 144. That is, the transmission housing member 22 includes the first bottom surface 141 and the first accommodating side surface 144 as surfaces that define the first plate bearing accommodating chamber S11.

In the present embodiment, the first accommodating side surface 144 is formed by the side surfaces 142, 143. The first accommodating side surface 144 extends in the rotation axis direction Z from the first bottom surface 141. The first accommodating side surface 144 has the shape of a C that opens toward the plate through-hole 26c. The first outer bottom portion 141a extends along the first accommodating side surface 144.

As shown in FIGS. 4 and 5, the first accommodating side surface 144 is slightly larger than the outer circumferential surface 101d of the first plate bearing 101 as viewed in the rotation axis direction Z. The first plate bearing 101 is accommodated in the first plate bearing accommodating chamber S1l with a bearing clearance Cr11 between the first plate bearing 101 and the first accommodating side surface 144. The bearing clearance Cr11 is play for allowing displacement due to dimensional errors, and is smaller than the first clearance Cr1. Thus, the first plate bearing 101 is restricted from moving in the rotation direction M by contacting the first accommodating side surface 144. In other words, the first accommodating side surface 144 is regarded to be surrounding the first plate bearing 101 so as to prevent the first plate bearing 101 from moving. That is, the first plate bearing accommodating chamber S11 of the present embodiment can be regarded to be accommodating the first plate bearing 101 with the first plate bearing 101 restricted from moving in the rotation direction M.

Since the plate recess 122 and the second plate extending portion 132, which define the second plate bearing accommodating chamber S12, are similar to the first plate recess 121 and the first plate extending portion 131, detailed description will be omitted.

In the present embodiment, the first plate bearing 101 and the second plate bearing 102 correspond to the "fixed bearings," and the first plate bearing accommodating chamber S1l and the second plate bearing accommodating chamber S12 correspond to the "fixed bearing accommodating chambers." The first bottom surface 141 corresponds to the "fixed bearing accommodating bottom surface," and the first accommodating side surface 144 corresponds to the "fixed bearing accommodating side surface."

Figure 6:
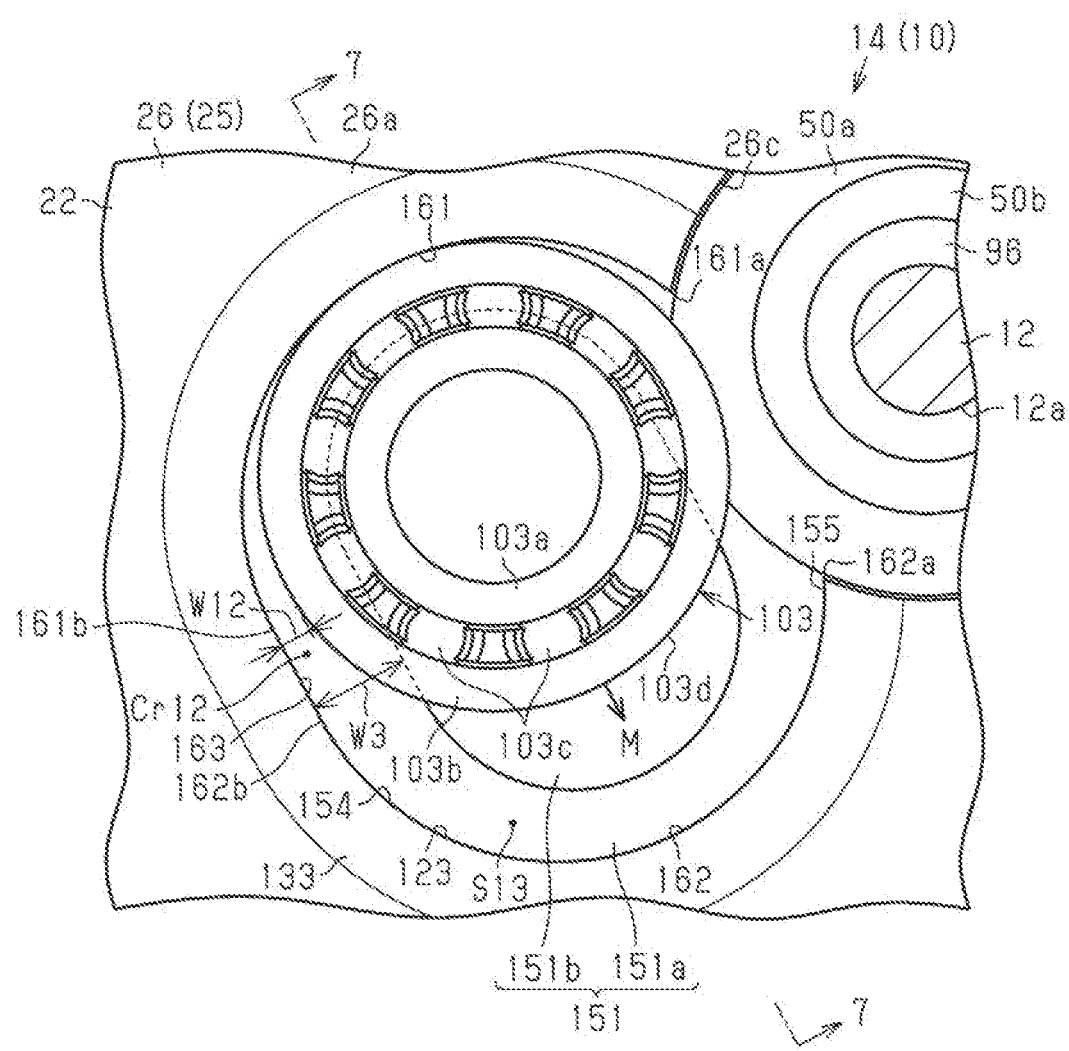
FIG. 6 is a partially enlarged view of a third plate bearing when a third roller is at a first position.
Figure 7:
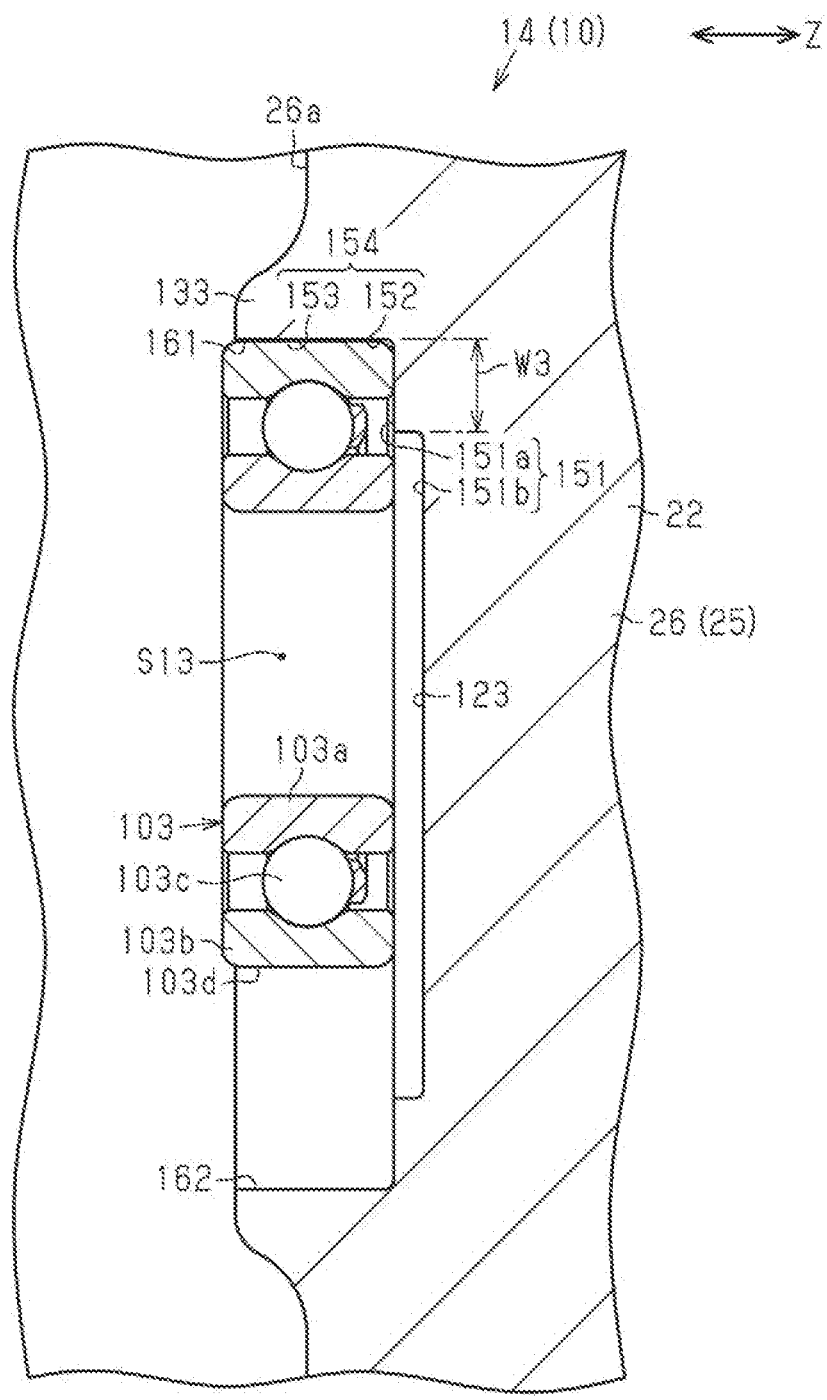
FIG. 7 is a cross-sectional view taken along line 7-7 in FIG. 6.

Next, with reference to FIGS. 6 to 9, the third plate recess 123 and the third plate extending portion 133, which define the third plate bearing accommodating chamber S13, will be described. FIG. 6 is a front view of the third plate bearing 103 in a state in which the third roller 73 is at the first position, and FIG. 7 is a cross-sectional view taken along line 7-7 in FIG. 6. FIG. 8 is a front view of the third plate bearing 103 in a state in which the third roller 73 is at an intermediate position between the first position and the second position. FIG. 9 is a front view of the third plate bearing 103 in a state in which the third roller 73 is at the second position.

As shown in FIGS. 6 and 7, the third plate recess 123 is configured to accommodate the third plate bearing 103 such that the third plate bearing 103 is movable in the rotation direction M. For example, the third plate recess 123 has an oval shape of which the longitudinal direction agrees with the rotation direction M (in other words, a tangential direction of the rotation direction M. The third plate recess 123 opens to the plate through-hole 26c, and the third plate recess 123 is continuous with the plate through-hole 26c.

The third plate recess 123 includes a third bottom surface 151 and a third recess side surface 152, which extends from the third bottom surface 151.

The third bottom surface 151 is formed to have an oval shape of which the longitudinal direction agrees with the rotation direction M. As in the case of the third bottom surface 151, the third recess side surface 152 has an oval shape of which the longitudinal direction agrees with the rotation direction M as viewed in the rotation axis direction Z. The third recess side surface 152 does not have a completely closed annular shape, but opens to the plate through-hole 26c.

The third plate extending portion 133 is located on the periphery of the third plate recess 123. The third plate extending portion 133 includes a third extending side surface 153, which is continuous with the third recess side surface 152. The third recess side surface 152 and the third extending side surface 153 are flush with each other.

The third plate bearing accommodating chamber S13 of the present embodiment is defined by the third bottom surface 151 and a third accommodating side surface 154. That is, the transmission housing member 22 includes the third bottom surface 151 and the third accommodating side surface 154 as surfaces that define the third plate bearing accommodating chamber S13.

In the present embodiment, the third accommodating side surface 154 is a surface that extends in the rotation axis direction Z from the third bottom surface 151. The third accommodating side surface 154 includes the third recess side surface 152 and the third extending side surface 153. In the present embodiment, the third bottom surface 151 corresponds to the "bottom surface that define the movable bearing accommodating chamber," and the third accommodating side surface 154 corresponds to the "accommodating side surface that define the movable bearing accommodating chamber."

The third accommodating side surface 154 has an inner opening 155 that opens to the plate through-hole 26c. Accordingly, the third accommodating side surface 154 does not have a completely closed annular shape, but opens inward in the radial direction R. The inner opening 155 opens inward in the radial direction R. The third plate bearing accommodating chamber S13 and the plate through-hole 26c are continuous with each other through the inner opening 155.

The third plate bearing 103 is accommodated in the third plate bearing accommodating chamber S13 so as to be movable in the rotation direction M.

Specifically, as shown in FIGS. 6 and 9, the third accommodating side surface 154 includes a first supporting surface 161 and a second supporting surface 162. When the third roller 73 is at the first position, the first supporting surface 161 supports the third plate bearing 103. When the third roller 73 is at the second position, the second supporting surface 162 supports the third plate bearing 103.

When the third roller 73 is at the first position, the first supporting surface 161 contacts the third plate bearing 103, so as to support the third plate bearing 103. The first supporting surface 161 is, for example, a curved surface of which the curvature is smaller than that of the outer circumferential surface 103d of the third plate bearing 103. The first supporting surface 161 is recessed in a direction opposite to the rotation direction M. When the third roller 73 is at the first position, the first supporting surface 161 contacts the third plate bearing 103 from the rotation direction M. This restricts the third roller 73 from moving further than the first position in the direction opposite to the rotation direction M. In other words, the first supporting surface 161 is configured to contact the third plate bearing 103 so as to restrict the third roller 73 to the first position.

In the present embodiment, the first supporting surface 161 is, for example, an arcuate surface. Since the inner opening 155 is provided, the central angle of the first supporting surface 161 is slightly smaller than 180°. However, the central angle of the first supporting surface 161 may be changed to any angle that is larger than or smaller than 180°.

The first supporting surface 161 includes a first inner end portion 161a, which is connected to the inner surface of the plate through-hole 26c, and a first outer end portion 161b, which is farther from the plate through-hole 26c (in other words, from the high speed shaft 12) than the first inner end portion 161a. In a situation in which the third roller 73 is at the first position, the first outer end portion 161b is arranged at a position that is spaced apart from and on the outer side of the third plate bearing 103 in the radial direction R.

The second supporting surface 162 is spaced apart from the first supporting surface 161 in the rotation direction M. When the third roller 73 is at the second position, the second supporting surface 162 contacts the third plate bearing 103, so as to support the third plate bearing 103. The second supporting surface 162 is, for example, a curved surface of which the curvature is smaller than that of the outer circumferential surface 103d of the third plate bearing 103. The second supporting surface 162 is recessed in the rotation direction M. When the third roller 73 is at the second position, the second supporting surface 162 contacts the third plate bearing 103 from the direction opposite to the rotation direction M. This restricts the third roller 73 from moving further than the first position in the rotation direction M. In other words, the second supporting surface 162 is configured to contact the third plate bearing 103 so as to restrict the third roller 73 to the second position.

That is, in the present embodiment, the first supporting surface 161 and the second supporting surface 162 are opposed to each other, and are curved surfaces that are recessed away from each other. The third roller 73 is moved within a movement range from the first position to the second position.

In the present embodiment, the second supporting surface 162 is, for example, an arcuate surface. Since the inner opening 155 is provided, the central angle of the second supporting surface 162 is smaller than 180°. However, the central angle of the second supporting surface 162 may be changed to any angle that is larger than or smaller than 180°.

The second supporting surface 162 includes a second inner end portion 162a, which is connected to the inner surface of the plate through-hole 26c, and a second outer end portion 162b, which is farther from the plate through-hole 26c (in other words, from the high speed shaft 12) than the second inner end portion 162a. In a situation in which the third roller 73 is at the second position, the second outer end portion 162b is arranged at a position that is spaced apart from and on the outer side of the third plate bearing 103 in the radial direction R.

Due to the difference in curvature between the first supporting surface 161 and the outer circumferential surface 103d of the third plate bearing 103, a clearance in the radial direction R exists between the first supporting surface 161 and the third plate bearing 103. Likewise, a clearance in the radial direction R exists between the second supporting surface 162 and the third plate bearing 103.

As shown in FIGS. 6 to 9, the transmission housing member 22 has a specified space Cr12, which is located on the outer side of the third plate bearing 103 in the radial direction R when the third roller 73 moves from the first position to the second position. In the present embodiment, the specified space Cr12 is provided inside the third plate bearing accommodating chamber S13.

In the present embodiment, the third accommodating side surface 154 includes a separated surface 163, which is separated from the third plate bearing 103 (specifically, from the outer circumferential surface 103d of the third plate bearing 103). The separated surface 163 is provided at a position that is on the outer side of and separated from the third plate bearing 103 in the radial direction R. Specifically, the separated surface 163 is on the outer side in the radial direction R of the movement path of the third plate bearing 103 in a case in which the third roller 73 moves from the first position to the second position. The specified space Cr12 is a clearance between the separated surface 163 and the third plate bearing 103 regardless of the position of the third plate bearing 103. In the present embodiment, the specified space Cr12 corresponds to the "clearance between the separated surface and the outer circumferential surface of the movable bearing."

In the present embodiment, the specified space Cr12 is larger than, for example, the bearing clearance Cr11. Specifically, the width W12 of the specified space Cr12 is larger than the width W11 of the bearing clearance Cr11.

The width W11 of the bearing clearance Cr11 varies in correspondence with displacement of the first plate bearing 101. Also, the width W12 of the specified space Cr12 varies in correspondence with the position of the third plate bearing 103. In this case, the minimum value of the width W12 of the specified space Cr12 (in other words, the shortest distance between the separated surface 163 and the third plate bearing 103) is preferably greater than the maximum value of the width W11 of the bearing clearance Cr11 (the longest distance between the first plate bearing 101 and the first accommodating side surface 144). However, the present disclosure is not limited to this, and the minimum value of the width W12 of the specified space Cr12 may be greater than the minimum value of the width W11 of the bearing clearance Cr11. Alternatively, the maximum value of the width W12 of the specified space Cr12 may be greater than the maximum value of the width W11 of the bearing clearance Cr11.

In the present embodiment, the separated surface 163 is located on the outer side in the radial direction R of the inner opening 155 of the third accommodating side surface 154 with the third plate bearing 103 in between. The separated surface 163 extends in the direction in which the supporting surfaces 161, 162 are opposed to each other (in other words, in the rotation direction M) to connect the outer end portion 161b, 162b of the supporting surface 161, 162 to each other.

As already described, the third roller 73 is held by the ring portion 62 and the high speed shaft 12, and is pushed toward the high speed shaft 12 by the ring portion 62. Accordingly, the third roller 73 is unlikely to be moved outward in the radial direction R. Further, the third roller 73 and the third plate bearing 103 are configured to move integrally. Thus, even though the specified space Cr12 exists, the third plate bearing 103 is unlikely to be moved toward the separated surface 163.

Also, as shown in, for example, FIG. 6, a portion of the third plate bearing 103 on the inner side in the radial direction R is located in the plate through-hole 26c through the inner opening 155. The portion of the third plate bearing 103 that is located in the plate through-hole 26c is separated from the high speed shaft 12, the stopper portion 50b, and the flanges 96. This prevents the portion of the third plate bearing 103 on the inner side in the radial direction R from sliding against other components.

That is, in the present embodiment, the movement range of the third roller 73 from the first position to the second position includes a specified range, in which the third roller 73 is not supported, in the radial direction R, by the transmission housing member 22 with the third plate bearing 103 in between, but is supported by being held between the ring portion 62 and the high speed shaft 12.

In the specified range, the specified space Cr12 exists as a clearance between the separated surface 163 and the third plate bearing 103 (specifically, the outer circumferential surface 103d of the third plate bearing 103), so that the third plate bearing 103 is unlikely to contact the separated surface 163. In other words, the specified range of the present embodiment can be regarded as a range in which the specified space Cr12 exists between the separated surface 163 and the third plate bearing 103.

As shown in FIG. 7, in the present embodiment, the third bottom surface 151 has a stepped structure and includes a third outer bottom portion 151a, which extends along the third accommodating side surface 154 (specifically, the third recess side surface 152), and a third inner bottom portion 151b, which is located on the inner side of the third outer bottom portion 151a and is recessed with respect to the third outer bottom portion 151a.

The third outer bottom portion 151a has the shape of a ring that has a specific third width W3, and extends in the circumferential direction of the third accommodating side surface 154. In other words, the third outer bottom portion 151a extends from the third accommodating side surface 154 toward the center of the third bottom surface 151 by the third width W3. In the present embodiment, the third outer bottom portion 151a is formed to have the shape of an oval ring of which the longitudinal direction agrees with the rotation direction M. The third outer bottom portion 151a opens to the plate through-hole 26c.

In the present embodiment, the outer race 103b of the third plate bearing 103 is supported by the third outer bottom portion 151a. On the other hand, the inner race 103a of the third plate bearing 103 is not supported by the third outer bottom portion 151a.

Specifically, the third width W3 is wider than the thickness of the outer race 103b of the third plate bearing 103. Also, the third width W3 is set to be shorter than the thickness of the third plate bearing 103 as a whole such that the inner edge of the third outer bottom portion 151a is located on the outer side of the outer circumferential surface of the inner race 103a. Accordingly, the inner race 103a of the third plate bearing 103 and the third inner bottom portion 151b are opposed to each other with a clearance in between.

In the present embodiment, the third width W3 is set to correspond to the specified space Cr12. Specifically, the third width W3 is set to be wider than the sum of the thickness of the outer race 103b and the width W12 of the specified space Cr12. In other words, the third outer bottom portion 151a extends from the separated surface 163 inward in the radial direction R by a length longer than the width W12 of the specified space Cr12, so as to contact the outer race 103b.

The third inner bottom portion 151b is recessed away from the third plate bearing 103 with respect to the third outer bottom portion 151a. The third inner bottom portion 151b is surrounded by the third outer bottom portion 151a. The third inner bottom portion 151b is oval as viewed in the rotation axis direction Z. The third inner bottom portion 151b is continuous with the inner surface of the plate through-hole 26c. In the present embodiment, the third outer bottom portion 151a corresponds to the "contact portion" and the "outer bottom portion,", and the third inner bottom portion 151b corresponds to the "inner bottom portion."

Although not illustrated, the plate through-hole 26c is supplied with oil. That is, the transmission 14 of the present embodiment includes a supplying mechanism that supplies oil into the plate through-hole 26c. Accordingly, oil is supplied to the seal member 50a. The specific configuration of the supplying mechanism is not particularly limited.

As already described, since the plate through-hole 26c is continuous with the plate bearing accommodating chambers S11 to S13, the oil supplied to the plate through-hole 26c is also supplied to the plate bearing accommodating chambers S11 to S13. Accordingly, oil is supplied to the plate bearings 101 to 103.

Operation of the present embodiment will now be described.

When the rollers 71 to 73 are not rotating, the third plate bearing 103 and the first supporting surface 161 contact each other. This positions the third roller 73 at the first position.

In other words, the first supporting surface 161 can be regarded as an element that positions the third roller 73 at the first position, and the first position can be regarded as an initial position.

On the other hand, when the ring portion 62 rotates as the low speed shaft 11 rotates, the rollers 71 to 73 rotate. In this case, the third roller 73 moves in the rotation direction M from the first position toward the second position. Accordingly, the third plate bearing 103 may move within the third plate bearing accommodating chamber S13. The moved distance of the third roller 73 varies depending on the torque. As the third roller 73 moves in the rotation direction M, the third plate bearing 103 contacts the second supporting surface 162, so that the third roller 73 is positioned at the second position. In other words, the second supporting surface 162 can be regarded as an element that positions the third roller 73 at the second position. When the rotation of the rollers 71 to 73 stops, the third roller 73 returns to the first position.

As shown in FIGS. 6 to 9, the movement range of the third roller 73 from the first position to the second position includes the specified range, in which the third roller 73 is not supported, in the radial direction R, by the transmission housing member 22 with the third plate bearing 103 in between, but is supported by being held between the ring portion 62 and the high speed shaft 12. In the specified range, the third plate bearing 103 and the transmission housing member 22 are unlikely to slide on each other.

Specifically, when the third plate bearing 103 moves as the third roller 73 moves, the third plate bearing 103 and the third accommodating side surface 154 (for example, the separated surface 163) are unlikely to slide on each other since the specified space Cr12 is provided. In other words, the specified space Cr12 reduces or eliminates the sliding area between the third plate bearing 103 and the third accommodating side surface 154 when the third roller 73 moves from the first position to the second position. That is, the specified space Cr12 is used to avoid or limit the contact between the third plate bearing 103 and the third accommodating side surface 154.

The present embodiment, which has been described above, achieves the following advantages.

(1) The transmission 14 includes the transmission housing member 22, the annular ring portion 62, the high speed shaft 12, the three rollers 71 to 73, and the roller bearings 101 to 106, which are radial bearings. The ring portion 62 is arranged inside the transmission housing member 22 and configured to rotate as the low speed shaft 11 rotates. The high speed shaft 12 is located on the inner side of the ring portion 62. The rollers 71 to 73 are provided between the ring portion 62 and the high speed shaft 12. The rollers 71 to 73 contact both of the inner circumferential surface 63 of the ring portion 62 and the outer circumferential surface 12a of the high speed shaft 12.

The rollers 71 to 73 include the third roller 73. The third roller 73 is a movable roller that moves in the rotation direction M of the ring portion 62 in response to the rotation of the ring portion 62. The rollers 71 to 73 include the first roller 71 and the second roller 72. The first roller 71 and the second roller 72 are fixed rollers that do not move in the rotation direction M of the ring portion 62.

The roller bearings 101 to 106 include the third plate bearing 103. The third plate bearing 103 is a movable bearing that rotatably supports the third roller 73, which is a movable roller. The transmission housing member 22 includes the first supporting surface 161 and the second supporting surface 162, which is spaced apart from the first supporting surface 161 in the rotation direction M. The first supporting surface 161 contacts the third plate bearing 103 so as to restrict the third roller 73 to the first position. The second supporting surface 162 contacts the third plate bearing 103 so as to restrict the third roller 73 to the second position. The third roller 73 is moved within a movement range from the first position to the second position.

With the above-described configuration, the movement range includes the specified range, in which the third roller 73 is not supported, in the radial direction R of the high speed shaft 12, by the transmission housing member 22 with the third plate bearing 103 in between, but is supported by being held between the ring portion 62 and the high speed shaft 12.

With this configuration, the movement range from the first position to the second position includes the specified range. Thus, when the third roller 73 moves from the first position to the second position, the third plate bearing 103 and the transmission housing member 22 are unlikely to slide on each other. This allows the third plate bearing 103 to move smoothly, preventing the third plate bearing 103 from blocking the movement of the third roller 73 in the rotation direction M. The configuration also limits wear caused by sliding motion of the third plate bearing 103 and the transmission housing member 22.

Also, in the specified range, since the third roller 73 is supported, in the radial direction R of the high speed shaft 12, by being held between the ring portion 62 and the high speed shaft 12, the third roller 73 is unlikely to be displaced in the radial direction R. Accordingly, the third roller 73 is unlikely to be displaced in the radial direction R due to the specified range. Thus, the high speed shaft 12 is unlikely to be displaced due to the specified range.

Also, the high speed shaft 12 is positioned by the first roller 71 and the second roller 72, which are fixed against movement in the rotation direction. Thus, the high speed shaft 12 is unlikely to be displaced due to the specified space Cr12. This achieves the above-described advantages, while preventing displacement of the high speed shaft 12.

(2) The transmission housing member 22 includes the third bottom surface 151 and the third accommodating side surface 154. The third bottom surface 151 and the third accommodating side surface 154 define the third plate bearing accommodating chamber S13, which accommodates the third plate bearing 103. The third accommodating side surface 154 extends from the third bottom surface 151 in the rotation axis direction Z, which is the axial direction of the high speed shaft 12, and includes the supporting surfaces 161, 162.

The third accommodating side surface 154 includes the separated surface 163, which is separated from the outer circumferential surface 103d of the third plate bearing 103. In the specified range, a clearance (specifically, the specified space Cr12) exists between the separated surface 163 and the outer circumferential surface 103d of the third plate bearing 103.

With this configuration, the specified space Cr12, which is a clearance between the separated surface 163 and the outer circumferential surface 103d of the third plate bearing 103, prevents the separated surface 163 and the third plate bearing 103 from sliding on each other. Accordingly, the above-described advantages are achieved.

(3) The first supporting surface 161 and the second supporting surface 162 are curved surfaces of which the curvatures are smaller than that of the outer circumferential surface 103d of the third plate bearing 103. The supporting surfaces 161, 162 are opposed to each other. The separated surface 163 extends in the direction in which the supporting surfaces 161, 162 are opposed to each other, and connects the first outer end portion 161*b*, which is an end portion of the first supporting surface 161, to the second outer end portion 162*b*, which is an end portion of the second supporting surface 162.

With this configuration, since the first supporting surface 161 and the second supporting surface 162 are curved at a curvature smaller than that of the outer circumferential surface 103*d* of the third plate bearing 103, the radial direction R exists between the supporting surfaces 161, 162 and the third plate bearing 103. Accordingly, even if the third plate bearing 103 is displaced slightly when moving, the supporting surfaces 161, 162 support the third plate bearing 103.

Also, since the curvature of the first supporting surface 161 and the second supporting surface 162 is smaller than that of the outer circumferential surface 103*d* of the third plate bearing 103, the outer end portion 161*b*, 162*b* and the third plate bearing 103 are separated from each other. This separates the separated surface 163, which connects the outer end portions 161*b*, 162*b* to each other, from the third plate bearing 103, so that the specified space Cr12 exists. This allows the supporting surfaces 161, 162 to reliably support the third plate bearing 103, while providing the specified space Cr12.

(4) The transmission housing member 22 includes the plate portion 26, which has the third bottom surface 151 and the third accommodating side surface 154. The plate portion 26 has the plate through-hole 26*c*, through which the high speed shaft 12 is passed. The third accommodating side surface 154 has the inner opening 155 that opens inward in the radial direction R. The third plate bearing accommodating chamber S13 and the plate through-hole 26*c* are continuous with each other through the inner opening 155, and the third plate bearing 103 is partially located in the plate through-hole 26*c*.

With this configuration, since the third plate bearing 103 is partially located in the plate through-hole 26*c*, the third plate bearing 103 and the high speed shaft 12 are located close to each other, allowing the size of the transmission 14 to be reduced in the radial direction R. Also, the portion of the third plate bearing 103 that is located in the plate through-hole 26*c* does not slide on the third accommodating side surface 154. This prevents the third plate bearing 103 and the third accommodating side surface 154 from sliding on each other.

Since the third plate bearing accommodating chamber S13 and the plate through-hole 26*c* are continuous with each other through the inner opening 155, so that oil can flow therebetween. Thus, if oil is supplied to the plate through-hole 26*c*, some of the oil is supplied to the third plate bearing 103. This allows the third plate bearing 103 to move smoothly.

(5) The roller bearings 101 to 106 include the first plate bearing 101. The first plate bearing 101 is a fixed bearing that rotatably supports the first roller 71, which is a fixed roller. The transmission housing member 22 has the first plate bearing accommodating chamber S11, which is a fixed bearing accommodating chamber accommodating the first plate bearing 101. The transmission housing member 22 includes the first bottom surface 141 and the first accommodating side surface 144 as surfaces that define the first plate bearing accommodating chamber S11. The first accommodating side surface 144 extends in the rotation axis direction Z from the first bottom surface 141. The first plate bearing 101 is accommodated in the first plate bearing accommodating chamber S1*l* with a bearing clearance Cr11 between the first plate bearing 101 and the first accommodating side surface 144. In this configuration, the specified space Cr12 is larger than the bearing clearance Cr11.

With this configuration, even if the first plate bearing 101 is displaced, the first clearance Cr1 allows the first plate bearing 101 to be accommodated in the first plate bearing accommodating chamber S11. In this case, depending on the manner in which the displacement occurs, a portion of the first plate bearing 101 may contact the first accommodating side surface 144.

In this regard, since the specified space Cr12 is wider than the first clearance Cr1 in the present embodiment, the third plate bearing 103 is unlikely to contact the third accommodating side surface 154 even if the third plate bearing 103 is displaced. This reliably prevents the third plate bearing 103 and the third accommodating side surface 154 from sliding on each other.

(6) The third plate bearing 103 is a rolling-element bearing that includes the inner race 103*a* and the outer race 103*b*. The inner race 103*a* rotates with respect to the outer race 103*b* as the third roller 73 rotates. The third bottom surface 151 includes the third outer bottom portion 151*a*, which is a contact portion. The third outer bottom portion 151*a* contacts the outer race 103*b* of the third plate bearing 103 but does not contact the inner race 103*a* of the third plate bearing 103.

With this configuration, the third plate bearing 103 is supported by causing the third outer bottom portion 151*a* to contact the outer race 103*b* of the third plate bearing 103. The outer race 103*b* of the third plate bearing 103 is less likely to rotate than the inner race 103*a* when the third roller 73 rotates. Thus, the outer race 103*b* of the third plate bearing 103 and the third outer bottom portion 151*a* are unlikely to slide on each other. Also, since the inner race 103*a* of the third plate bearing 103 and the third outer bottom portion 151*a* do not contact each other, sliding is unlikely to occur. This allows the third plate bearing 103 to be supported, while limiting wear due to sliding.

(7) The third bottom surface 151 has a stepped structure including the third outer bottom portion 151*a* and the third inner bottom portion 151*b*. The third outer bottom portion 151*a* extends along the third accommodating side surface 154. The third inner bottom portion 151*b* is arranged on the inner side of the third outer bottom portion 151*a* and is recessed with respect to the third outer bottom portion 151*a*.

With this configuration, since the third outer bottom portion 151*a* extends along the third accommodating side surface 154, the third plate bearing 103 and the third outer bottom portion 151*a* contact each other even if the third plate bearing 103 moves. This allows the third plate bearing 103 to be supported when it is moving. Since the third inner bottom portion 151*b* is recessed with respect to the third outer bottom portion 151*a*, the third inner bottom portion 151*b* is unlikely to contact the third plate bearing 103. This prevents the third inner bottom portion 151*b* and the third plate bearing 103 from sliding on each other.

(8) The centrifugal compressor 10 includes the transmission 14, the electric motor 13, which rotates the low speed shaft 11, and the impeller 52, which is attached to the high speed shaft 12. Thus, the centrifugal compressor 10 achieves the above-described advantages.

(9) The centrifugal compressor 10 includes the impeller chamber S3, which accommodates the impeller 52. The plate portion 26 of the transmission housing member 22 is used to define the impeller chamber S3. For example, the centrifugal compressor 10 includes the compressor housing member 23, which cooperates with the plate portion 26 to define the impeller chamber S3. The plate portion 26 is a wall portion that separates the transmission chamber S2, which is the internal space of the transmission housing member 22, and the impeller chamber S3 from each other.

With this configuration, since the plate portion 26 is also used to define the impeller chamber S3, the structure is simplified.

In this configuration, the heat generated in the impeller 52 may be transferred to the plate portion 26 and cause thermal expansion of the plate portion 26. This may slightly displace the third accommodating side surface 154, and the displacement may result in a disadvantage that the movement of the third plate bearing 103, which is accommodated in the third plate bearing accommodating chamber S13, is hampered.

In this respect, since the present embodiment includes the specified range within the movement range, the movement of the third plate bearing 103 is unlikely to be hampered even if thermal expansion of the plate portion 26 occurs. This suppresses the above disadvantage.

(10) The third plate bearing accommodating chamber S13 is arranged on the outer side of the high speed shaft 12 in the radial direction R. The separated surface 163 is provided at a position that is on the outer side of and separated from the third plate bearing 103 in the radial direction R. The specified space Cr12 is a clearance between the separated surface 163 and the third plate bearing 103 regardless of the position of the third plate bearing 103. This configuration achieves advantages such as the above item (1).

The above-described embodiment may be modified as follows. Any combination of the above-described embodiment and the following modifications is possible as long as there is no technical inconsistency.

Figure 10:
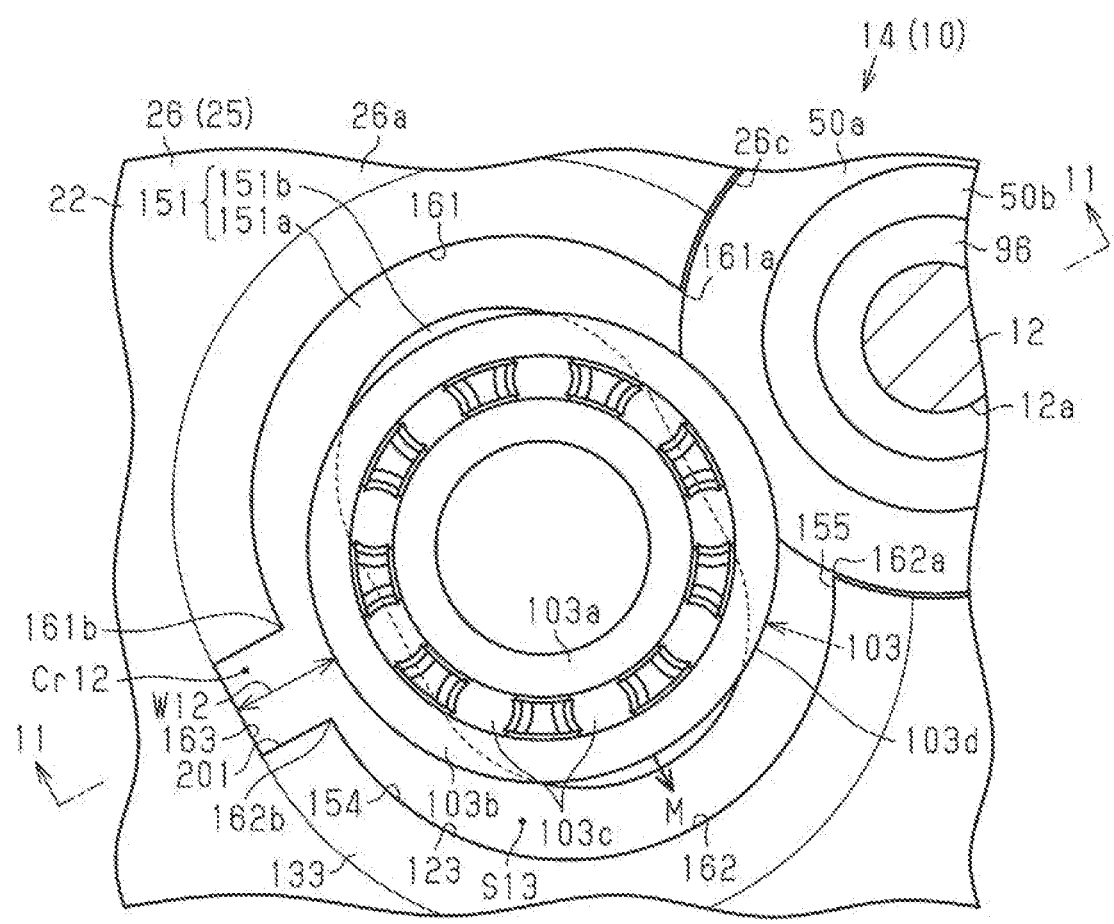
FIG. 10 is a front view showing a third plate bearing accommodating chamber according to a modification.
Figure 11:
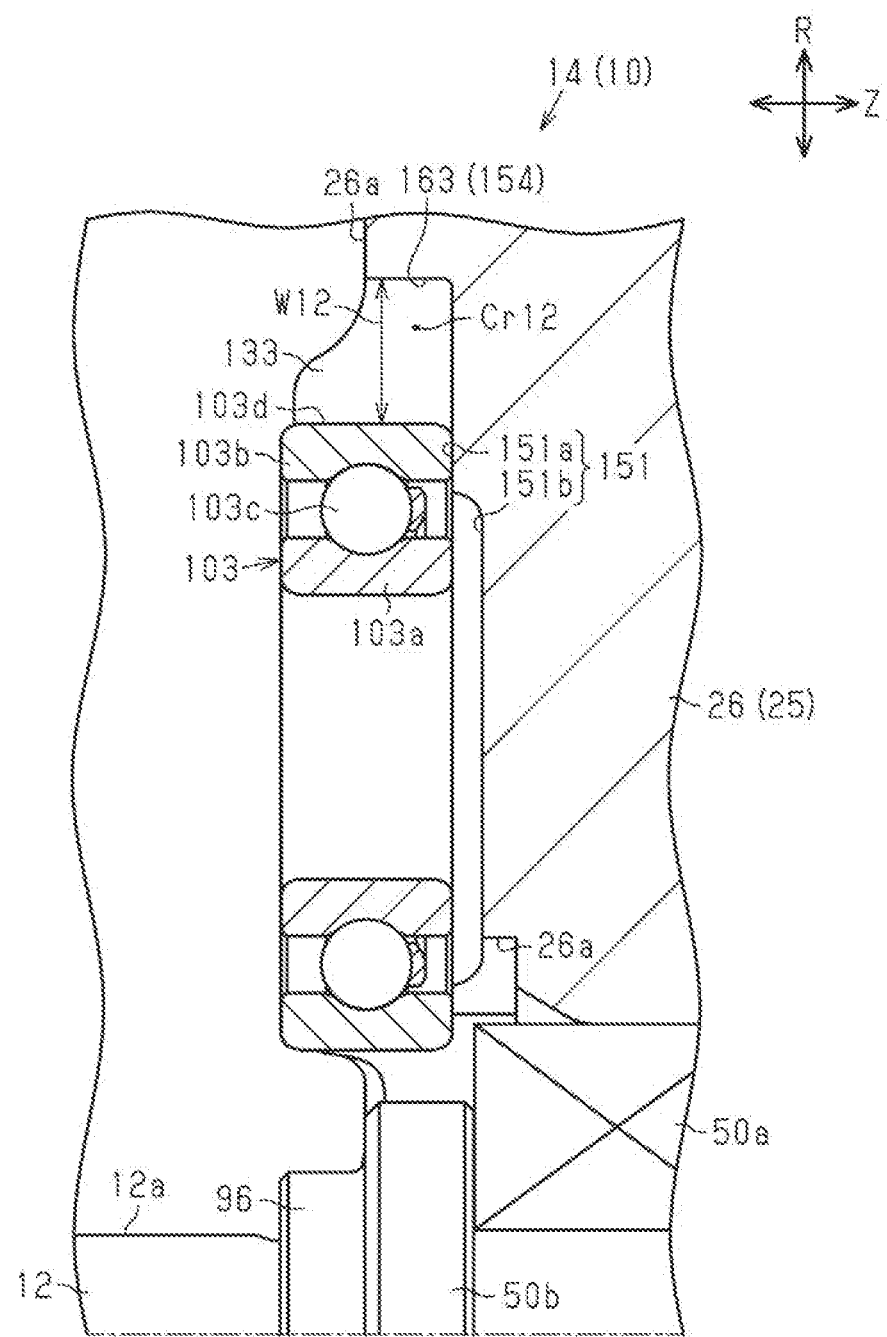
FIG. 11 is a cross-sectional view taken along line 11-11 in FIG. 10.

As shown in FIGS. 10 and 11, part of the third plate extending portion 133 may be cut out. For example, the third plate extending portion 133 may include an outer opening 201 in an outer part in the radial direction R. The outer opening 201 is located at a position that corresponds to the separated surface 163. Thus, the separated surface 163 of the third accommodating side surface 154 of this modification is formed only by the third recess side surface 152.

Also, the separated surface 163 of this modification may be recessed outward in the radial direction R with respect to the supporting surfaces 161, 162. In this case, the third accommodating side surface 154 has a stepped structure between the supporting surfaces 161, 162 and the separated surface 163.

With this configuration, the specified space Cr12 is widened in the radial direction R. This reliably prevents the third accommodating side surface 154 from hampering the movement of the third plate bearing 103.

The third plate recess 123 may be omitted. In this case, the third plate bearing accommodating chamber S13 is preferably defined by the first plate surface 26a and the third extending side surface 153 of the third plate extending portion 133. With this configuration, the third extending side surface 153 forms the supporting surfaces 161, 162 and the separated surface 163.

In the above-described configuration, the third extending side surface 153 may have an opening at a position that corresponds to the separated surface 163. In this case, the separated surface 163 does not exist, and the internal space of the opening corresponds to the specified space Cr12. This also prevents the third plate bearing 103 and the third accommodating side surface 154 from sliding on each other. The same applies to the first plate recess 121 and the plate recess 122.

The third plate extending portion 133 may be omitted. In this case, the third recess side surface 152 forms the supporting surfaces 161, 162 and the separated surface 163. The same applies to the first plate extending portion 131 and the second plate extending portion 132.

The number of the rollers may be any number greater than two. The number of the movable rollers and the number of the fixed rollers may also be changed.

The curvature of the supporting surfaces 161, 162 may be changed, and, for example, may be the same as the curvature of the outer circumferential surface 103d of the third plate bearing 103.

The third bottom surface 151 may have an opening at a position that corresponds to the third inner bottom portion 151b. That is, the third bottom surface 151 may be formed only by the third outer bottom portion 151a. The same applies to first bottom surface 141.

The third bottom surface 151 does not necessarily need to have a stepped structure. That is, both of the inner race 103a of the third plate bearing 103 and the outer race 103b may contact the third bottom surface 151. The same applies to first bottom surface 141.

The third plate bearing accommodating chamber S13 and the plate through-hole 26c do not necessarily need to be continuous with each other. In this case, the third accommodating side surface 154 preferably includes a surface at a position that is on the inner aide of and spaced a part from the third plate bearing 103 in the radial direction R. The same applies to the first plate bearing accommodating chamber S11.

In the above-described embodiment, the third outer bottom portion 151a is located on the entire circumference of the third accommodating side surface 154. However, the third outer bottom portion 151a may be formed in part of the accommodating side surface 154. Alternatively, the third outer bottom portion 151a may be formed intermittently.

The base portion 61 and the low speed shaft 11 may be formed integrally. Also, the base portion 61 and the ring portion 62 may be formed integrally.

The specific configuration of the compression unit 15 is not particularly limited to the one with the impeller 52, but may be any type such as a vane type or a scroll type.

The transmission 14 may be mounted on any structure other than the centrifugal compressor 10. For example, the transmission 14 may be mounted on a fluid machine such as a pump, which does not compress fluid.

The transmission 14 and the centrifugal compressor 10 may be mounted on any structure other than a vehicle.

The centrifugal compressor 10 may be employed in any suitable application to compress any type of fluid. For example, the centrifugal compressor 10 may be employed in an air conditioner to compress refrigerant, which is fluid.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:
1. A transmission, comprising:
a transmission housing member;
an annular ring portion that is provided in the transmission housing member and rotates as a low speed shaft rotates;
a high speed shaft that is arranged on an inner side of the ring portion;
at least three rollers that are provided between the ring portion and the high speed shaft and contact both of an inner circumferential surface of the ring portion and an outer circumferential surface of the high speed shaft; and
radial bearings with which the rollers are rotatably supported by the transmission housing member, wherein
the rollers include:
a movable roller that moves in a rotation direction of the ring portion in response to rotation of the ring portion; and
a fixed roller that is fixed so as not to move in the rotation direction of the ring portion,
the radial bearings include a movable bearing that rotatably supports the movable roller,
the transmission housing member includes:
a first supporting surface that contacts the movable bearing so as to restrict the movable roller to a first position; and
a second supporting surface that is provided at a position spaced apart from first supporting surface in the rotation direction and contacts the movable bearing so as to restrict the movable roller to a second position,
movement of the movable roller is performed within a movement range from the first position to the second position, and
the movement range includes a specified range in which the movable roller is not supported, in a radial direction of the high speed shaft, by the transmission housing member with the movable bearing in between, but is supported by being held between the ring portion and the high speed shaft.
2. The transmission according to claim 1, wherein
the transmission housing member includes, as surfaces that define a movable bearing accommodating chamber that accommodates the movable bearing:
a bottom surface; and
an accommodating side surface that extends in an axial direction of the high speed shaft from the bottom surface and includes the first supporting surface and the second supporting surface,
the accommodating side surface includes a separated surface provided at a position separated from an outer circumferential surface of the movable bearing, and
in the specified range, a clearance exists between the separated surface and the outer circumferential surface of the movable bearing.
3. The transmission according to claim 2, wherein
the first supporting surface and the second supporting surface are curved surfaces having a curvature that is smaller than a curvature of the outer circumferential surface of the movable bearing,
the first supporting surface and the second supporting surface are opposed to each other, and
the separated surface extends in a direction in which the supporting surfaces are opposed to each other, so as to connect an end portion of the first supporting surface and an end portion of the second supporting surface to each other.
4. The transmission according to claim 2, wherein the separated surface is recessed outward in the radial direction of the high speed shaft with respect to the supporting surfaces.
5. The transmission according to claim 1,
the transmission housing member includes a plate portion,
the plate portion includes, as surfaces that define a movable bearing accommodating chamber that accommodates the movable bearing:
a bottom surface; and
an accommodating side surface that extends in an axial direction of the high speed shaft from the bottom surface and includes the first supporting surface and the second supporting surface,
the plate portion includes a plate through-hole, through which the high speed shaft is passed,
the accommodating side surface includes an inner opening that opens inward in the radial direction of the high speed shaft,
the movable bearing accommodating chamber and the plate through-hole are continuous with each other through the inner opening, and
the movable bearing is partially located in the plate through-hole.
6. The transmission according to claim 1,
the transmission housing member includes, as surfaces that define a movable bearing accommodating chamber that accommodates the movable bearing:
a bottom surface; and
an accommodating side surface that extends in an axial direction of the high speed shaft from the bottom surface and includes the first supporting surface and the second supporting surface,
the movable bearing is a rolling-element bearing that includes:
an outer race; and
an inner race that rotates with respect to the outer race as the movable roller rotates, and
the bottom surface includes a contact portion that is formed to contact the outer race and not to contact the inner race.
7. The transmission according to claim 6, wherein
the bottom surface has a stepped structure including:
an outer bottom portion that extends along the accommodating side surface; and
an inner bottom portion that is arranged on an inner side of the outer bottom portion and is recessed with respect to the outer bottom portion, and
the contact portion is the outer bottom portion.
8. A centrifugal compressor, comprising:
the transmission according to claim 1;
an electric motor that rotates the low speed shaft; and
an impeller that is attached to the high speed shaft.
9. The centrifugal compressor according to claim 8, wherein
the transmission housing member includes a plate portion,
the plate portion includes, as surfaces that define a movable bearing accommodating chamber that accommodates the movable bearing:
a bottom surface; and
an accommodating side surface that extends in an axial direction of the high speed shaft from the bottom surface and includes the first supporting surface and the second supporting surface, the centrifugal compressor comprises a compressor housing member that cooperates with the plate portion to define an impeller chamber that accommodates the impeller, and the plate portion is a wall portion that separates a transmission chamber, which is an internal space of the transmission housing member, and the impeller chamber from each other.

10. A transmission, comprising:

a transmission housing member;

an annular ring portion that is provided in the transmission housing member and rotates as a low speed shaft rotates;

a high speed shaft that is arranged on an inner side of the ring portion;

at least three rollers that are provided between the ring portion and the high speed shaft and contact both of an inner circumferential surface of the ring portion and an outer circumferential surface of the high speed shaft; and roller bearings with which the at least three rollers are rotatably supported by the transmission housing member, wherein the at least three rollers include:
  at least one movable roller that moves, in response to rotation of the ring portion, between a first position and a second position that is spaced apart from the first position in a rotation direction of the ring portion; and
  at least two fixed rollers that are fixed so as not to move in the rotation direction of the ring portion, the roller bearings include a movable bearing that rotatably supports the movable roller, the transmission housing member includes, as surfaces that define a movable bearing accommodating chamber that accommodates the movable bearing:
  a bottom surface; and
  an accommodating side surface that extends from the bottom surface and includes the first supporting surface and the second supporting surface, the movable bearing accommodating chamber is arranged on an outer side of the high speed shaft in a radial direction of the high speed shaft, the accommodating side surface includes:
  a first supporting surface that contacts the movable bearing so as to support the movable bearing when the movable roller is at the first position; and
  a second supporting surface that is provided at a position spaced apart from the first supporting surface in the rotation direction, and contacts the movable bearing so as to support the movable bearing when the movable roller is at the second position, the accommodating side surface includes a separated surface provided at a position separated from the movable bearing and on an outer side of the movable bearing in the radial direction of the high speed shaft, and a clearance exists between the separated surface and the movable bearing regardless of a position of the movable bearing.

11. The transmission according to claim 10, wherein the separated surface is on the outer side, in the radial direction of the high speed shaft, of a movement path of the movable bearing in a case in which the movable roller moves from the first position to the second position.

12. The transmission according to claim 10, wherein
the roller bearings include fixed bearings that rotatably support the fixed rollers, the transmission housing member includes, as surfaces that define fixed bearing accommodating chambers that accommodate the fixed bearings:
  a fixed bearing accommodating bottom surface; and
  a fixed bearing accommodating side surface that extends from the fixed bearing accommodating bottom surface, the fixed bearings are accommodated in the fixed bearing accommodating chambers with a bearing clearance between the fixed bearings and the fixed bearing accommodating side surface, and a clearance between the separated surface and the movable bearing is greater than bearing clearances.

* * * * *